United States Patent [19]

Fogel

[11] Patent Number: 6,008,865
[45] Date of Patent: Dec. 28, 1999

[54] SEGMENTATION-BASED METHOD FOR MOTION-COMPENSATED FRAME INTERPOLATION

[75] Inventor: Sergei Fogel, Rochester, N.Y.

[73] Assignee: Eastman Kodak Company, Rochester, N.Y.

[21] Appl. No.: 08/934,262

[22] Filed: Sep. 19, 1997

Related U.S. Application Data

[60] Provisional application No. 60/038,024, Feb. 14, 1997.

[51] Int. Cl.[6] ........................................................ H04N 5/14
[52] U.S. Cl. .......................... 348/700; 348/169; 382/236
[58] Field of Search .................................... 348/700, 699, 348/169, 170, 171, 584, 586; 382/103, 236, 291

[56] References Cited

U.S. PATENT DOCUMENTS

| | | |
|---|---|---|
| 5,030,984 | 7/1991 | Buckler et al. . |
| 5,063,524 | 11/1991 | Ferre et al. ............................. 382/107 |
| 5,241,608 | 8/1993 | Fogel . |
| 5,530,774 | 6/1996 | Fogel . |
| 5,684,715 | 11/1997 | Palmer ................................... 345/157 |
| 5,684,887 | 11/1997 | Lee et al. ................................ 348/586 |
| 5,686,973 | 11/1997 | Lee ......................................... 382/236 |

OTHER PUBLICATIONS

M. Bierling and R. Thoma, "Motion–compensating Interpolation Considering Covered and Uncovered Background," *Signal Processing: Image Communication*, pp. 191–212, 1989.

Philippe Robert, "Motion Compensating Interpolation Considering Occluding, Appearing and Disappearing Areas," *Signal Processing of HDTV, III*, H. Yasuda and L. Chiariglione (Eds.), pp. 329–341, Elsevier Publishers, Amsterdam, 1992.

Zhoa, I; et al. "A New Algorithm for Motion–Compensated Frame Interpolation," Conference Paper for IEEE International Symposium on Circuits and Systems; pp. 9–12, May 1993.

Grammalidis, N; et al. "Temporal Frame Interpolation for Stereoscopic SequenceS3d using Object–Based Motion Estimation and Occlusion Detection," Proceedings, International Conference on Image Processing. pp. 382–385, Oct. 1995.

*Primary Examiner*—Tommy P. Chin
*Assistant Examiner*—John A. Voisinet
*Attorney, Agent, or Firm*—David M. Woods

[57] ABSTRACT

A method of motion compensated frame interpolation wherein an intermediate image frame is generated between two image frames in a motion image sequence. The method includes the steps of: identifying a moving foreground or object and the background for two successive frames in a motion image sequence; estimating a velocity vector field for the foreground, and a velocity vector field for the background; using the estimated velocity vector field for the foreground to identify the location of the foreground and the background in the intermediate image; and obtaining the intermediate image by using the foreground velocity vector field to perform motion compensated interpolation for the foreground in the intermediate image and using the background velocity vector field to perform motion compensated interpolation for the background in the intermediate image.

5 Claims, 5 Drawing Sheets

SEGMENTATION-BASED METHOD FOR MOTION-COMPENSATED FRAME INTERPOLATION

CROSS-REFERENCE TO RELATED APPLICATIONS

The present application claims the benefit of U.S. Provisional application Ser. No. 60/038,024, filed Feb. 14, 1997. The present application is related to U.S. application Ser. No. 07/823,723, filed Jan. 22, 1992, by Sergei Fogel, and entitled, "Method of Modifying a Time-Varying Image Sequence by Estimation of velocity Vector Fields".

FIELD OF THE INVENTION

The invention relates generally to the field of digital image processing, and in particular to motion compensation in digital motion image processing. More specifically, the invention relates to a method for motion compensation useful in video frame interpolation.

BACKGROUND OF THE INVENTION

Motion compensation is widely used in digital video processing algorithms to exploit temporal redundancy in an effort to produce high-quality results. An example of video processing is frame interpolation, used for standards conversion as well as for generation of slow and fast motion in motion picture film/video post-production. In frame interpolation, direct temporal interpolation, i.e. without using motion information, results either in blurring or temporal aliasing when there is relative motion between objects from frame-to-frame. Motion-compensated interpolation, on the other hand, is capable of producing results without blur and aliasing.

The success of motion-compensated interpolation hinges on the accuracy of the motion information. Because motion estimation is an underdetermined problem, it relies on a priori constraints and information about the motion vector field (e.g. smoothness), the image intensity, and models for the 3-D-to-2-D projection. When such constraints becomes invalid, motion estimation becomes inaccurate. When a background is occluded with an object moving across the background, fundamental constraints such as image intensity conservation (the optical flow constraint), used in motion estimation, becomes invalid. At the boundaries of the occluded regions, corresponding to object boundaries, smoothness of the motion field is invalid since motion of occluding objects may be significantly different. Occlusions manifest themselves as covered and uncovered regions, or self occlusions due to local deformation in non-rigid objects. Of particular interest for the subject invention are occlusions that are due to covered/uncovered regions, assuming that object deformations are sufficiently small. A depiction of such regions for a hypothetical 1-D case is given in FIGS. 1A and 1B.

FIG. 1A is a depiction of an occlusion in a 1-D image. As the rectangular object 10 in Frame 1 at time $t_P$, moves against a stationary background 12 to a new location indicated by the location of the rectangular object 10' in Frame 2, at time $t_Q$, FIG. 1B, it covers region 16 and uncovers region 14. The uncovered region 14 is absent at time $t_P$ and the covered region 16 is absent at time $t_Q$. The 1-D example is shown for simplicity with the understanding that 2-D and 3-D occlusions may also occur.

FIG. 2 illustrates an Intermediate Frame, occurring at time t, wherein the region 16 is partially covered and the region 14 is partially uncovered by the rectangular object 10". In other words, the object 10 moved from its position in Frame 1 to the position shown in the Intermediate Frame to its final position shown in Frame 2. Applying linear trajectories 20 between like points at times $t_P$ and $t_Q$ provides information about the image at time t. To be noted: If the time period between $t_P$ and $t_Q$ is great, any non-linear motion of the rectangular object 10 at time t will not be accurately detected resulting in an inaccurate Intermediate Frame determination. In a like manner, if the object 10 linearly moved to, for example, the far left and linearly back to the position shown in Frame 2, the Intermediate Frame would not represent that motion. Therefore, the time between $t_P$ and $t_Q$ must be relatively small for accurate results when using the present algorithm. Applying motion-compensated, bi-directional interpolation along the linear motion trajectories 20 results in occluded regions 18 in the intermediate frame, denoted by ellipses. Image intensities for the occluded regions are copied from the appropriate existing frame. That is, for the occluded region 18, the image intensities are copied from Frame 2, and for the occluded region 18' image intensities are copied from Frame 1. The trajectories 20 shown are ideal trajectories assuming exact motion estimation.

In summary then, using motion-compensated frame interpolation, a frame at an intermediate time instance, t, is interpolated from existing frames that are captured at times $t_P$ and $t_Q$, where $t_P < t < t_Q$. The linear motion trajectories 20 (vectors) are estimated between the existing Frames 1 and 2 such that they describe linear trajectories passing through pixel locations at the missing Intermediate Frame. FIG. 2 assumes the ideal case where motion vectors are accurate and the occluded regions 18 are accurately detected and handled. For linear motion trajectories (vectors) corresponding to non-occluded regions a linear combination (e.g. a weighted average) of the two image values at times $t_P$ and $t_Q$ is used to estimate the missing pixel value through which the associated vector passes. In uncovered regions of the Intermediate Frame, background intensity values from the future frame, Frame 2, are taken as the estimates for the missing pixels. Conversely for covered regions the background intensity values for the past frame Frame 1 are taken as estimates for the missing pixel values. This is what is meant by "occlusion handling" in the context of frame interpolation.

The accuracy of motion estimation and detection of occlusion regions are important practical problems that have been addressed. See, for example, Philippe Robert, "motion compensating interpolation considering occluded, appearing and disappearing areas", Signal Processing of HDTV, III, H. Yasuda and Chiariglione (Eds.), pp. 329–341, Elsevier Publishers, Amsterdam, 1991; and M. Bierling and R. Thoma, "Motion-compensating interpolation considering covered and uncovered background", Signal Processing: Image Communication, pp. 191–212, 1989. In addition, inaccuracies in motion estimation are not limited to only occluded regions. In almost all motion estimation algorithms, the problems within the occluded region propagate to regions outside the occluded region, adversely affecting the estimates immediately outside the occluded region. This case is depicted in FIG. 3. The case of FIG. 3 should be viewed as a non-ideal version of the case shown in FIG. 2 and represents what happens in practice. The regions 22 and 22' containing the occluded regions 18 and 18', respectively, at the Intermediate Frame location of the rectangular object 10" over which motion estimates are inaccurate are designated "bad regions," respectively. In practice, motion estimates are inaccurate within "bad regions", containing the occluded regions 18 and 18' and the immediate neighborhood.

The origin of "bad regions" can be explained as follows: At occluded region boundaries, the motion vector field should not be smooth, however the optical flow constraint is valid. On the other hand, within the occluded region, the optical flow constraint is invalid, but the motion vector field is smooth. Therefore, a successful algorithm has to enforce/suppress these two constraints at the appropriate locations at and around the occluded regions. Most algorithms are incapable of doing so since they tend to enforce these constraints with a fixed relative strength for the entire image region. The Fogel algorithm (see S. Fogel, "The estimation of velocity vector fields from time-varying image sequences, Computer Vision Graphic and Image Processing: Image Understanding, vol. 53, pp. 253–287, 1991), on the other hand, deals with occlusions using an adaptive mechanism that attempts to detect occluded regions and to adjust the relative strengths of these two constraints. Detection of occluded regions is based on implicit detection of image intensity transitions (i.e. edges) and gradients of the motion vector field. Because detection of occluded regions is itself a difficult problem, the Fogel algorithm may be unable, for instance, to turn off the smoothness constraint at the exact position of the occlusion boundary. In fact, in certain cases, detection of edges may be rather difficult for the eye of an observer. This causes the propagation of estimation errors into what has been called the "bad regions" of FIG. 3.

There is a need therefore for an object-based method to accurately determine occluded regions, to remove the bad regions, and to perform appropriate interpolation of the Intermediate Field at occluded regions.

SUMMARY OF THE INVENTION

The present invention is directed to overcoming one or more of the problems set forth above. This is achieved by identifying and processing occluding objects separately. The contours of occluding objects (occlusion boundaries) are manually determined via an interactive drawing tool that has a graphical user interface. This segmentation in effect amounts to manually providing the Fogel algorithm with the information about where to enforce/suppress optical flow and smoothness constraints. Briefly summarized, according to one aspect of the present invention, a method of motion compensated frame interpolation wherein an intermediate image frame is generated between two image frames in a motion image sequence, includes the steps of: identifying a foreground and a background for two successive frames in a motion image sequence; estimating a velocity vector field for the foreground, and a velocity vector field for the background; using the estimated velocity vector field for the foreground to identify the location of the foreground and the background in the intermediate image; and obtaining the intermediate image by using the foreground velocity vector field to perform motion compensated interpolation for the foreground in the intermediate image and using the background velocity vector field to perform motion compensated interpolation for the background in the intermediate image.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention is more robust in the presence of noise in the original image and renders a more accurate intermediate image than Prior Art methods.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

The method of the present invention is useful as a tool to solve the problems that arise in "difficult" motion clips where errors due to inaccurate detection and mishandling of occlusion are most objectionable (e.g. close ups of faces, etc.). In many other cases, such as detailed scenes viewed from a distance (e.g. an explosion scene) one may not need to resort to this method. It should also be noted that this approach is not intended to solve the problems due to severe self occlusions (e.g. due to local deformations) that may take place within objects rather than at their boundaries.

In what follows, the main principle of the method of the present invention is described. Next, a detailed mathematical description of the method and its implementation is described.

Figure 4:
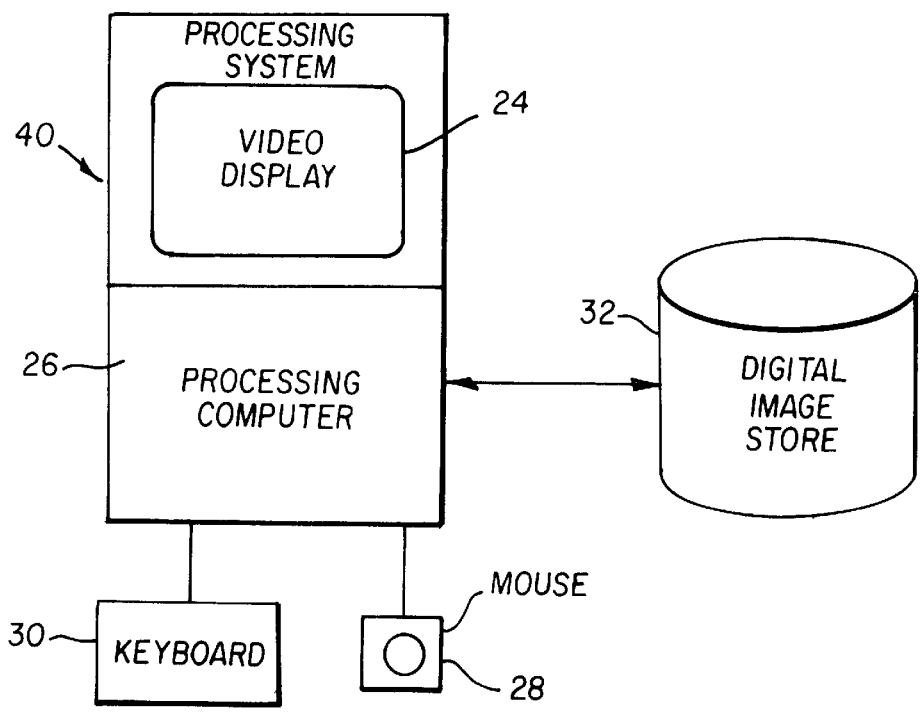
FIG. 4 is a block diagram illustrating an image processing system useful for practicing the present invention.

The main principle of the method will be described using the example where a foreground object partially occludes the background as discussed in the Background of the Invention. Referring now to FIG. 4, a digital image processing system 40 suitable for practicing the invention is shown. The system includes an image processing computer 26, such as a Silicon Graphics Indiga II or Sun Sparc Workstation a video display 24, keyboard 30, and an input device, such as a mouse 28, that is connected to the processing computer 26 to provide a graphical user interface for processing motion image sequences (frames of motion images). A digital image storage device 32, such as a magnetic hard drive or optical disc memory, stores the original motion image sequences and stores the processed motion image sequence(s).

Figure 1A:
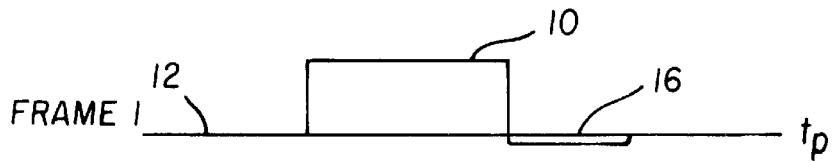
FIGS. 1A and 1B are diagrams useful in describing the present invention, showing two successive image frames having a moving object.
Figure 1B:
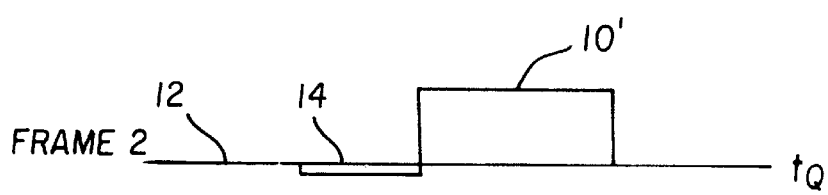
Figure 2:
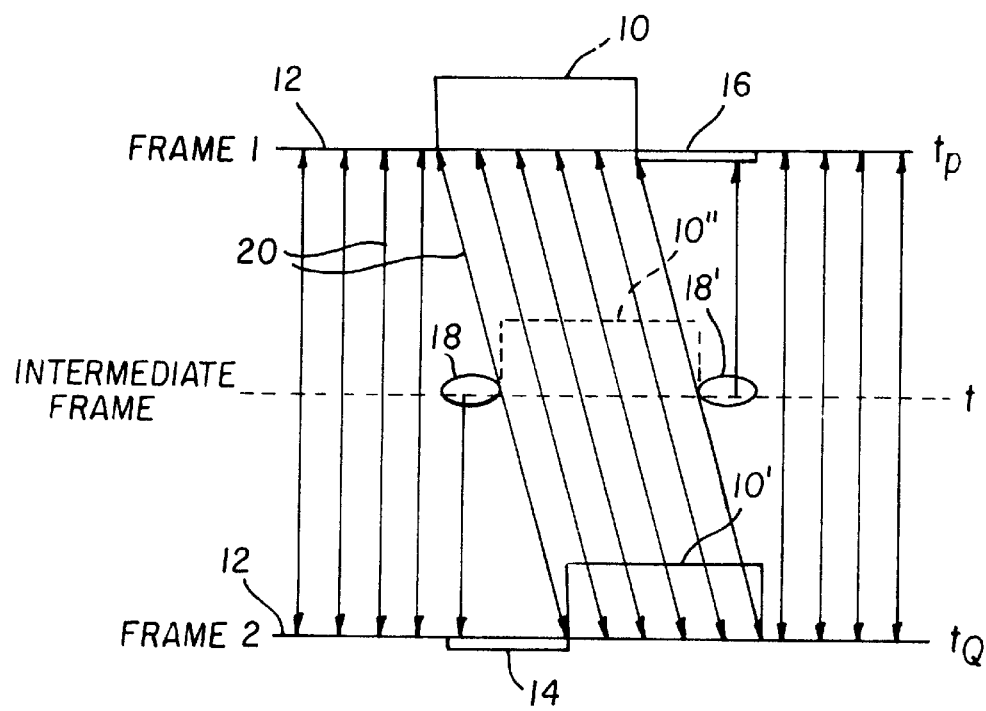
FIG. 2 is a diagram similar to that shown in FIGS. 1A and 1B, illustrating the generation of an Intermediate Frame at a time t and the resulting occluded regions.
Figure 3:
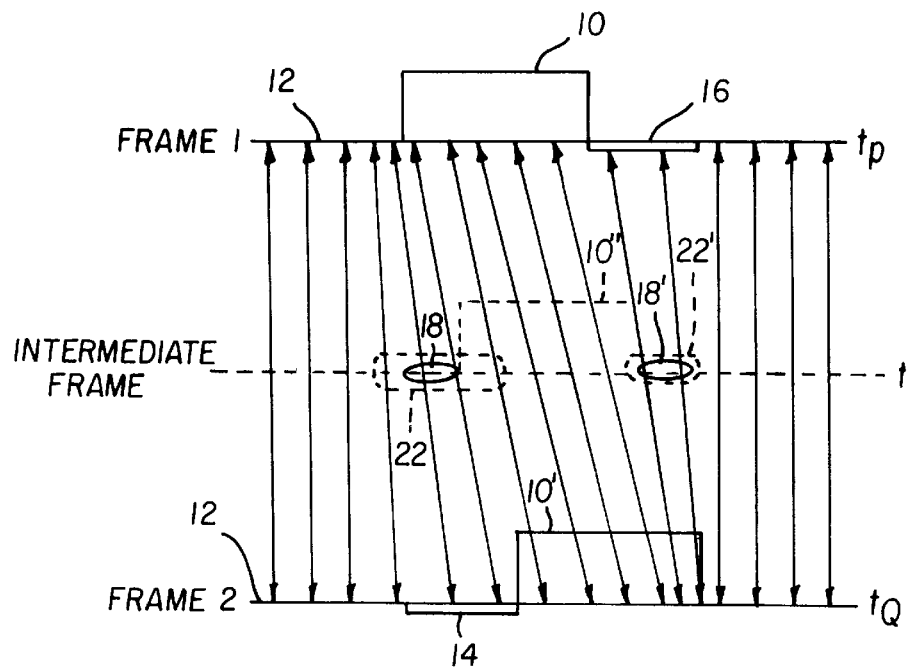
FIG. 3 is a diagram similar to that shown in FIG. 2, illustrating the problem of estimation of velocity vectors in the occluded regions.
Figure 5A:
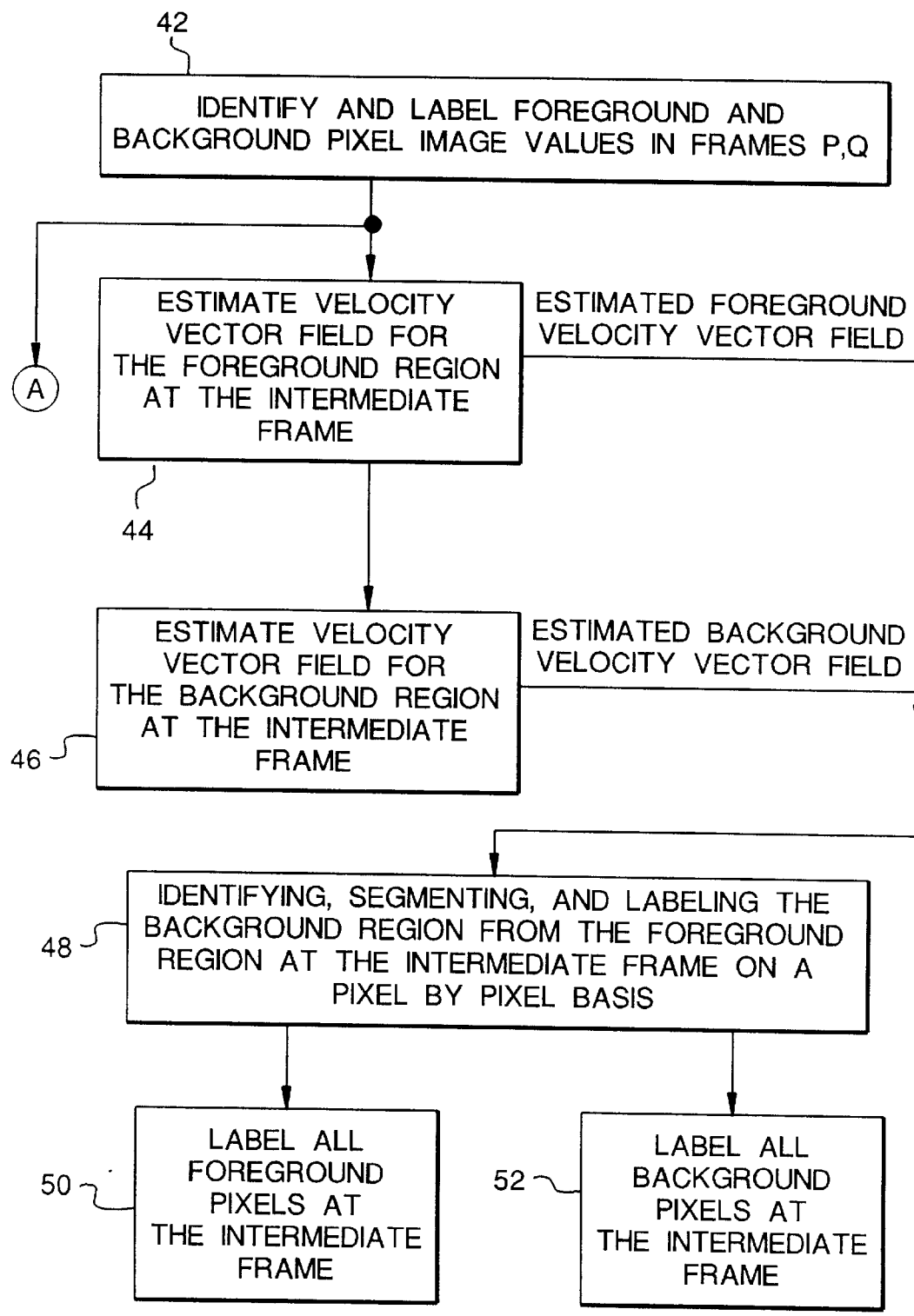
FIG. 5A and 5B form a flow chart that is useful in understanding the method of the present invention.
Figure 5B:
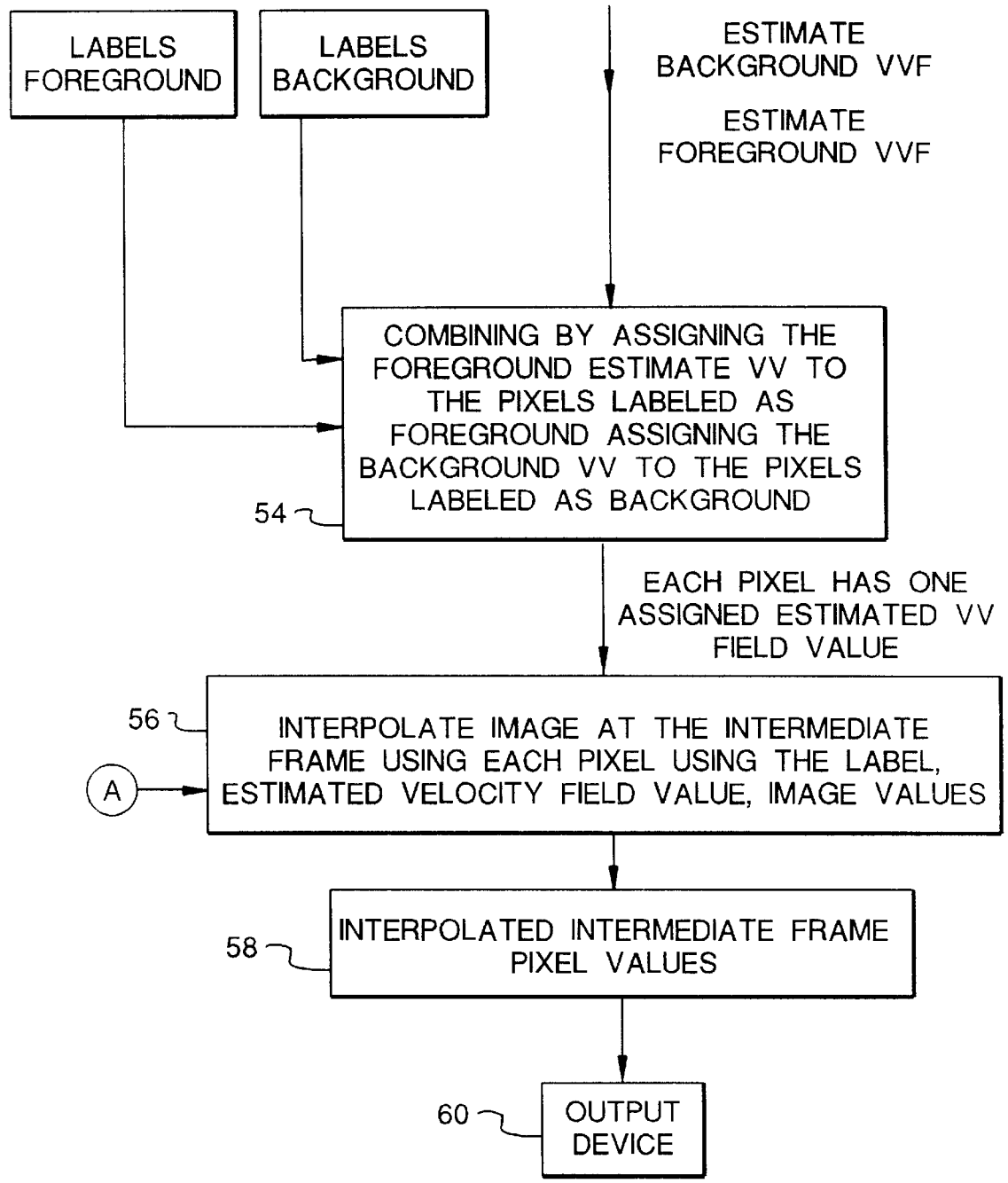

Referring now to FIG. 5A, to process a motion image sequence according to the present invention, the first step 42 is to identify the foreground and the background objects in the First and Second image frames at times $t_P$ and $t_Q$ by interactively drawing the boundaries of the foreground object(s) using any well known graphic user interface that provides for outlining areas in an image. Next, in step 44 and 46 the computer 26 estimates the velocity vector fields for the foreground and the background, respectively, in the Intermediate Frame at time t. The computer 26, then in step 48, identifies, segments, and labels the foreground and background regions for the intermediate image of the Intermediate Frame in the following manner: For each pixel determination in the intermediate image, the computer 26 uses the velocity vector at the pixel's location to locate corresponding points in Frames 1 and 2, at times $t_P$ and $t_Q$. If the pixel's location in both frames is in the foreground, the pixel is identified as a foreground pixel and labeled a 2, per step 50, otherwise, the pixel is identified as a background pixel and is labeled as a 1, per step 52. With overlapping foreground pixels, the first overlapping pixels are labeled 3 with overlaps on overlaps the label number increases by 1 for each overlap. Referring now to FIG. 5B, in step 54 the computer 26 obtains the intermediate image for time t as follows: For each pixel in the intermediate image, if it is a foreground pixel, the computer uses the estimated foreground velocity vector at that pixel to find the correspondingly located pixel in the two frames, and computes the time weighted average of the two points. If the pixel is a background pixel, the computer finds the pixel's value in the two frames using the estimated background velocity vector and if they are both background pixel values, computes the time weighted average of the two points. If only one of the two corresponding pixel values is a background pixel value, the computer 26 uses that value as the background pixel value; and if they are both foreground the computer determines the value of the pixel from the pixel values of neighboring background pixels in the intermediate image. For purposes of illustration, the Intermediate image Frame in FIGS. 2 and 3 has been shown at a time t midway between Frame 1 and Frame 2. It should be noted that the method of the present invention may be employed to generate an intermediate image or a number of intermediate images at any time or times between any two captured frames.

Each pixel at the output of step 54 has one assigned estimated velocity vector field value. Those pixels are next processed in step 56 to interpolate the values of each pixels' neighbors using the label, the estimated velocity vector field value, and the pixels' image value.

The output of step 56 is a set of interpolated Intermediate Frame pixel values 58 that may be used in conjunction with an output device 60, such as a display device, or stored in a storage device, or transmitted to a remote location for viewing, modification, storing, or printing.

To simplify and in turn speed-up the computer's processing time, it is advantageous to only process the pixel's illuminance values and to set the R(red) and G(green) pixel values to some constant, for example, zero for all pixels outside of the encompassed objects of interest. In other words the image outside of objects having motion from one frame to another will appear blue, if the R and G pixel values are set to zero or to some other uniform color if they are all set to other values.

Figure 6A:
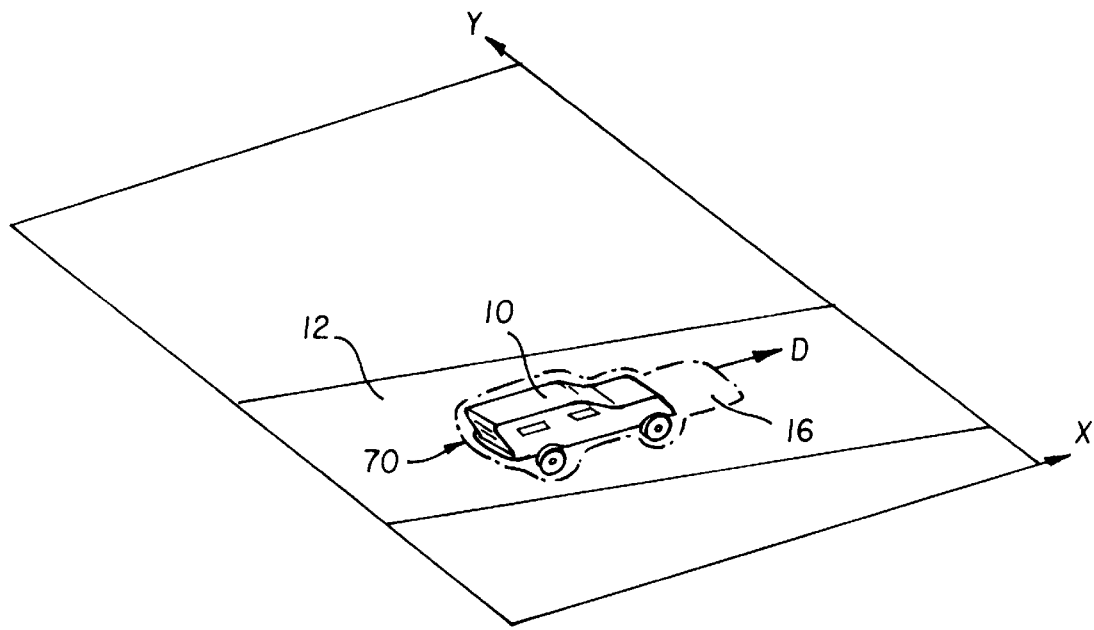
FIGS. 6A and 6B illustrate in diagram form a truck image moving over a background image and the results of that motion is a 1D image plane.

Referring now to FIG. 6A, the preferred embodiment of the method of the present invention will now be described in more detail. Using a graphical user interface, the user associates pixels of the existing frames with a "label" and a "flag." The (missing) pixels of the Intermediate Frame are associated with a "label" only. Labels are given integer values 1, 2, 3, . . . depending on the number of overlapping objects appearing in a frame. Flags represent either a "valid" or an "invalid" value, describing the validity of optical flow constraint as will be clear in the discussion that follows.

Referring to FIG. 6A, the truck, object 10, is encompassed (outlined) using any of the well known programs previously referenced to form the outline 70. The non-moving background to be occluded is the road portion labeled 16, as the truck 10 moves in the direction labeled D. Viewing FIG. 6A in conjunction with FIG. 6B, the occluding foreground (the truck) is assigned a label "2" and the background is assigned a label "1." The convention is such that the occluding object (in this case 10 and 10') is assigned a larger label than the occluded region. The user identifies the occluded regions on Frames 1 and 2 at times $t_P$ and $t_Q$, respectively. For example, the objects 10 and 10' are assigned the label "2" and the background 12 is assigned a label "1." Determination of the corresponding labels in the Intermediate Frame is discussed below.

This implementation is described generally as having the following steps:

Step 1. Create two frames from the original frames, at time $t_P$ and $t_Q$, by setting the image intensity to zero for regions labeled as "1." (Actual image intensity is maintained at pixels labeled as "2".) This effectively separates the foreground object from the background. The edges of the foreground object are now clearly defined for the Fogel application of the algorithm, without any interference from the background detail. The flags corresponding to the pixels of these two frames are then set to "valid" as previously states, with a color image, for example, an RGB image, the pixel values representing red and green may be set to zero and the blue pixel values can be set to a constant blue value. With that approach only the pixel values within the outlined object will be in R, G, B color and the background will be a substantially constant blue color.

Step 2. At this step, motion of the foreground object (truck) is estimated as described in detail below: estimate the linear motion trajectories between the frames created at the previous step, passing through a predetermined subset of pixel locations at t, using the Fogel algorithm of Appendix A. The resulting motion vector field is designated by $\upsilon_2{}^t$.

Step 3. Create two frames from the original frames, at times $t_P$ and $t_Q$, by setting the flags for pixels corresponding to label "2" to "invalid." Flags for the reset of the pixels are set to "valid."

Step 4. At this step, motion of the background object is estimated as described in detail below: estimate the linear motion trajectories between the two frames created at the previous step, passing through the same pixel grid at t, using the Fogel algorithm. During estimation, suppress the optical flow constraint completely unless the trajectory intercepts regions with flags set to "invalid". The resulting motion vector field is denoted by $\upsilon_1{}^t$. At the end of this step, at every pixel grid location at t, there are two trajectories/vectors $\upsilon_1{}^t$ and $\upsilon_2{}^t$.

Step 5. The estimated vector fields $\upsilon_1{}^t$ and $\upsilon_2{}^t$ both are interpolated to form dense vector fields where every pixel location, (i,j) at t has two associated vectors, $\upsilon_1{}'(i,j)$ and $\upsilon_2{}'(i,j)$.

Figure 6B:
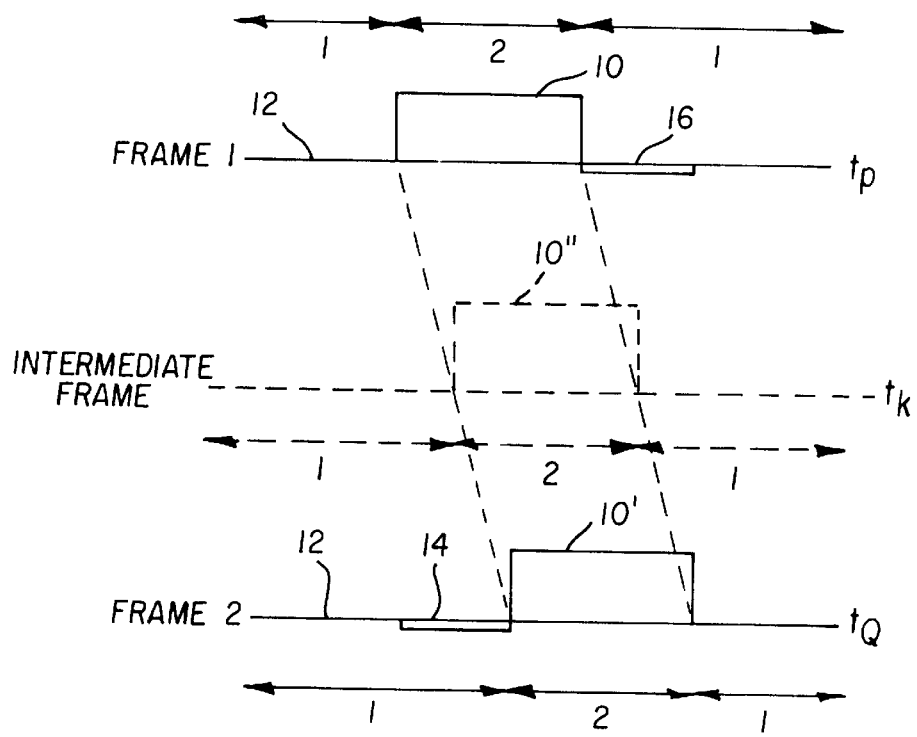

Step 6. At this step, the intermediate frame at time t is labeled: for every pixel grid location at t, if the associated trajectory intercepts regions labeled as "2" in both existing frames, we label that pixel as "2". Otherwise it is labeled as "1." An ideal labeling of the intermediate frame is shown in FIG. 6B. According to this labeling, each pixel is associated with a motion vector (or trajectory); pixel at location (i,j) is associated with vector $\upsilon_1{}'(i,j)$ if it is labeled as "1," otherwise $\upsilon_2{}^5(i,j)$ is the trajectory passing through (i,j). For every grid location, the appropriate vector is maintained.

Step 7. In this step, the covered and uncovered regions at the intermediate frame are detected and handled by appropriate interpolation. We denote the labels of co-located pixels at positions (i,j), at times $t_P$, t and $t_Q$, as L0(i,j)←L(i,j)→L1(i,j). We have the following rules for appropriate interpolation:

IF 2←-2→2 THEN use bilinear interpolation of the corresponding image values at times $t_P$ and $t_Q$, on the trajectory $\upsilon_2'(i,j)$ passing through (i,j), to fill in the pixel value at location (i,j) at time t. The weights in the bilinear interpolation depend on the relative time-distance between the intermediate and the existing frames. The trajectory may point to interpixel values at the existing frames. Image vectors at such locations are computed via spatial bilinear interpolation of neighboring pixel values.

IF 1←-1→1 THEN use bilinear interpolation of the corresponding image values at times $t_P$ and $t_Q$, on the trajectory $\upsilon_1'(i,j)$ passing through (i,j) to fill in the pixel value at location (i,j) at time t.

IF 2←-1→1 THEN pixel location (i,j) is within an uncovered region at the intermediate frame. (This can be seen in FIG. 6). This region should therefore be a part of the background. The image intensity at (i,j) should be taken from the future frame at $t_Q$, since this pixel is covered in the previous frame at time $t_P$. The intensity at (i,j) at time t is obtained by copying the intensity of the location where $\upsilon_1'(i,j)$ intercepts the frame at time $t_Q$. Again, if the intercept is positioned at an inter-pixel location, the intensity value is obtained using spatial bilinear interpolation.

IF 1←-1→2 THEN pixel location (i,j) is within a covered region at the intermediate frame. (This can be seen in FIG. 6). This region should therefore be a part of the background. However, the image intensity at (i,j) should be taken from the previous frame at $t_P$, since this pixel is covered in the future frame at time $t_Q$. The intensity at (i,j) at time $t_k$ is obtained by copying the intensity of the location where $\upsilon_1'(i,j)$ intercepts the frame at time $t_P$.

In order to reduce computation in Step 2 above, vector field $\upsilon_2^t$ can be estimated only for those pixel grid positions that lie in the convex hull of regions labeled as "2" in frames at time $t_P$ and $t_Q$.

The above method can be extended to an arbitrary number of occluding objects. Suppose that there are three objects, where object "3" (labeled as "3") is partially occluding object "2," and object "2" is partially occluding the background object labeled as "1." In this case, three motion vector fields, $\upsilon_1^t, \upsilon_2^t, \upsilon_3^t$, are estimated at the intermediate frame. In estimating $\upsilon_1^t$, pixels with labels smaller than "3" are set to zero, and all flags are set to "valid". For $\upsilon_2^t$, pixels with labels smaller than "2" (i.e. "1") are set to zero, the flags for pixels with larger labels (i.e. "3") are set to "invalid."

The object based approach to detection and handling of occlusions in motion-compensated frame interpolation according to the present invention requires the user to input boundaries of occluding objects through a graphical interface. It is useful, for processing difficult cases, to create smooth slow and fast motion. The method is best used by applying it locally to difficult image areas only, rather than to the entire frames.

An even more detailed description of the embodiment outlined above, sufficient to enable a person of ordinary skill in the art to program a digital computer to practice the method of the present invention is contained in the following mathematical based description:

The invention has been described with reference to a preferred embodiment. However, it will be appreciated that variations and modifications can be effected by a person of ordinary skill in the art without departing from the scope of the invention.

APPENDIX A

I. Mathematical Based Description

We shall deal with images of a scene taken at time moments within some time interval t. A time-varying image sequence is a sequence of images of a given scene with each successive image taken some time interval apart from the one preceding it. Given a time-varying image sequence of a scene corresponding to some sequence of time moments from the time interval t, it is often desirable to construct a time-varying image sequence of the same scene corresponding to some other sequence of time moments from the time interval t by constructing an intermediate image(s) (the images of a desired time-varying image sequence not present in a given time-varying image sequence). The algorithm to be described relates to a method for constructing a desired time-varying image sequence from a given time-varying image sequence by constructing an intermediate image herein after called the missing image.

To construct a missing image, first the correspondence between the missing image and the images of a given time-varying image sequence that surround the missing image is established. Then this correspondence is used to estimate the missing image through an interpolation process. The correspondence between the missing image and the surrounding images of a given time-varying image sequence establishes the apparent movements in these three images caused by the movements of objects in the scene. These apparent movements can be characterized by a velocity vector field defined on the missing image and linearly relating each point of the missing image to the points of the surrounding images. The construction of the missing image is then done in two stages: first the velocity vector field is estimated, second the estimate of the velocity vector field is used in a motion-compensated interpolation to obtain the missing image. Not all image points (pixels) will have corresponding points (pixels) in the given surrounding images, primarily due to occlusions, and allowances must be made to construct missing images with these occurrences.

Every image of the given time-varying image sequence is assumed to be obtained by projecting the light reflected by the visible portions of the objects in the scene at the time the image is taken onto an image plane, and then identifying the irradiance values of each image point (pixel) in the image plane. If the scene being imaged changes gradually with time, and if the changes are mostly due to the relative movements of the physical objects in space, then the corresponding changes in the successive images of the given time-varying image sequence can be used to estimate the velocity vector fields of the images. The original scene is shown captured in Frame 1 as a plurality of pixel values, $P_1$–$P_3$, for example. As is well known, the number of pixels to represent an image is dependent on a number of factor including the number of persons used in the photo sensor array capturing the sequence of scenes. In a three color system, three pixel values are used to record the scenes color at a pixel paint (location). These are denoted as the red, green, and blue values for an R, G, B, system.

II. Overview of the Estimation Algorithm

An image of a scene is modeled as a perspective projection of a scene onto an image plane and captured as a frame. The axes of the scene coordinate system are defined as the horizontal axis, the vertical axis, and the depth axis. The images of the scene are assumed to be in the same plane which is parallel to the horizontal and the vertical axes of the scene coordinate system. It is assumed that the horizontal and the vertical axes of each image are parallel respectively to the horizontal and the vertical axes of the scene. In what follows the horizontal image coordinates are denoted with the symbol x, the vertical image coordinates are denoted with the symbol y, and the time moments are denoted with the symbol t. For the missing image at the time moment t the horizontal component of the estimate of the velocity vector at the image point (x,y) is denoted by $\tilde{u}(x,y,t)$, while the vertical component of the estimate of the velocity vector at the image point (x,y) is denoted by $\tilde{v}(x,y,t)$. The estimate of the velocity vector field corresponding to the missing image at the time t is defined on some grid of points $\Omega_t$ in the image plane and is denoted as $(\tilde{u}(t), \tilde{v}(t)) \equiv \{(\tilde{u}(x,y,t), \tilde{v}(x,y,t))|(x,y)\in\Omega_t\}$. The grid of image points $\Omega_t$ is assumed to be generated by some vectors $h_{t,1}$ and $h_{t,2}$ in the image plane, which means that every image point (x,y) from the grid $\Omega_t$ can be expressed in the form $(x,y)=ih_{t,1}+jh_{t,2}$, where $ih_{t,1}+jh_{t,2}$ is a linear combination of the vectors $h_{t,1}$, $h_{t,2}$ with integer coefficients i,j.

Let the time moments of the given time-varying image sequence be $t_P$, $t_Q$; and let the time moments of the desired time-varying image sequence be $t_1, \ldots, t_K$. The sequence of time moments $t_1, \ldots t_K$ is assumed to be increasing and intermediate to the increasing sequence of time moments $t_P$, $t_Q$. The given image of the scene taken at the time moment $t_P$, called the previous image, and the given image of the scene taken at the time moment $t_Q$, called the next image, are digitized into multi-banded digital images, RGB for example, with three bands, B. For a monochrome version there would only be one band B. Each band of the previous and next digital images is defined as a two-dimensional array of numbers representing for example, the digital values of R, G and B, known as pixel values, taken from a grid of points on the image plane. The bands of the previous digital image are defined on some grid of image points $\Omega_{t_P}$, which is assumed to be generated by some vectors $h_{t_P,1}$ and $h_{t_P,2}$ in the image plane. The bands of the next digital image are defined on some grid of image points $\Omega_{t_Q}$, which is assumed to be generated by some vectors $h_{t_Q,1}$ and $h_{t_Q,2}$ in the image plane.

Given the previous digital image, which is defined on the grid of image points $\Omega_{t_P}$, taken at the time moment $t_P$ and consisting of the bands $I_{t_P,b}$, $b=1, \ldots, B$, where b, for example, at value 1 represents the red pixel component value, and b at 2 the green component value, and b at 3 the blue component value, and given the next digital image, which is defined on the grid of image points $\Omega_{t_Q}$, taken at the time moment $t_Q$ and consisting of the bands $I_{t_Q,b}$, $b=1, \ldots, B$, the process of constructing the desired time-varying image sequence consisting of the bands $I_{t_1,b}, \ldots, I_{t_K,b}$, $b=1, \ldots, B$ can be described as follows. First, the estimates $(\tilde{u}(t_1),\tilde{v}(t_1)), \ldots, (\tilde{u}(t_K),\tilde{v}(t_K))$ of the velocity vector fields, corresponding to the missing images at the time moments $t_1, \ldots, t_K$ respectively, are computed. The estimates $(\tilde{u}(t_1), \tilde{v}(t_1)), \ldots, (\tilde{u}(t_K),\tilde{v}(t_K))$ of the velocity vector fields are defined on the grids of image points $\Omega_{t_1}, \ldots, \Omega_{t_K}$ respectively. Then for each band $b=1, \ldots, B$ and for each time moment $t_k$, $k=1, \ldots, K$, the estimate $I_{t_k,b}$ of the missing image band, which is defined on the grid of image points $\Omega_{t_k}$, is obtained by the motion-compensated interpolation process.

It is an object of the invention to improve the accuracy of the estimation of the velocity vector field $(\tilde{u}(t_1),\tilde{v}(t_1)), \ldots, (\tilde{u}(t_K),\tilde{v}(t_K))$, by the following actions: first, partitioning the grids $\Omega_{t_P}$, $\Omega_{t_Q}$ into corresponding disjoint regions, $\Omega_{t_P,f}$, $\Omega_{t_Q,f}$, $f=1, \ldots, F$, representing distinct objects in the images of a scene; second, performing the estimation process separately for each pair $\Omega_{t_P,f}$, $\Omega_{t_Q,f}$ of the corresponding regions, resulting in the velocity vector fields $(\tilde{u}_f(t_1),\tilde{v}_f(t_1)), \ldots, (\tilde{u}_f(t_K), \tilde{v}_f(t_K))$, $f=1, \ldots, F$; and then combining the velocity vector fields $(\tilde{u}_1(t_k),\tilde{v}_1(t_k)), \ldots, (\tilde{u}_F(t_k),\tilde{v}_F(t_k))$ to form the velocity vector field $(\tilde{u}(t_k),\tilde{v}(t_k))$, for every $k=1, \ldots, K$. The partitioning is specified by providing the corresponding sets of connected line segments on the previous and the next images representing the boundaries of the regions. This task is performed by an operator outlining the objects using a graphical user interface to encompass each object. The partitioning is accomplished by integrating the specified boundaries of the previous and next images into the regions and then attaching a distinct integer label to the points of each set of the corresponding regions. The following convention is used: the regions with the higher label values may occlude the regions with the lower label values, and the regions with the higher label values may not be occluded by the regions with the lower label values.

III. Description of the Correspondence Algorithm

The proposed method of estimating the velocity vector field is based on the multi-level resolution approach where for every label the estimation process starts at the coarsest level of resolution with some constant velocity vector field taken as the initial estimate. This initial estimate of the velocity vector field is iteratively improved by solving the system of nonlinear equations and the resulted improved estimate is projected to the next finer level of resolution. The process is repeated until the final finest resolution level is reached.

In what follows, the symbol $\sigma$ is used to denote the current resolution level, the symbol M is used to denote the number of resolution levels, and the sequence of symbols $\sigma_1, \ldots, \sigma_M$ is used to denote the sequence of resolution levels listed in the fine-to-coarse order. For each label $f=1, \ldots, F$, each resolution level $\sigma=\sigma_1, \ldots, \sigma_M$, and each $k=1, \ldots, K$, the estimate of the velocity vector field at the resolution level $\sigma$ corresponding to the label $f$ and the missing image at the time moment $t_k$ is defined on some grid $\Omega_{t_k}^\sigma$ of points in the image plane and is denoted as $(\tilde{u}_f^\sigma(t_k),\tilde{v}_f^\sigma(t_k))\equiv\{(\tilde{u}_f^\sigma(x,y,t_k), \tilde{v}_f^\sigma(x,y,t_k))|(x,y)\in\Omega_{t_k}^\sigma\}$, while the improvement of the estimate of the velocity vector field at the resolution level $\sigma$ corresponding to the label $f$ and the missing image at the time moment $t_k$ is defined on the same grid $\Omega_{t_k}^\sigma$ of points in the image plane and is denoted as $(\Delta\tilde{u}_f^\sigma(t_k),\Delta\tilde{v}_f^\sigma(t_k))\equiv\{(\Delta \tilde{u}_f^\sigma(x,y,t_k),\Delta\tilde{v}_f^\sigma(x,y,t_k))|(x,y)\in\Omega_{t_k}^\sigma\}$. For each resolution level $\sigma=\sigma_1, \ldots, \sigma_M$, and each $k=1, \ldots, K$, the following is assumed to be held; the grid of points $\Omega_{t_k}^\sigma$ is generated by some vectors $h_{t_k,1}^\sigma$ and $h_{t_k,2}^\sigma$ in the image plane; and the grid of points $\Omega_{t_k}$ in the image plane is assumed to be surrounded by the grid of points $\Omega_{t_k}^{\sigma_M}$, meaning that the convex hall of the grid of points $\Omega_{t_k}$ belongs to the convex hall of the grid of points $\Omega_{t_k}^\sigma$.

For each label $f=1, \ldots, F$, on each level $\sigma=\sigma_1, \ldots, \sigma_M$ of the multi-level resolution process, and for each $k=1, \ldots, K$, a system of nonlinear equations relative to the unknown current estimate $(\tilde{u}_f^\sigma(t_k), \tilde{v}_f^\sigma(t_k))$ of the velocity vector field is formed, then the iterative improvement $(\Delta\tilde{u}_f^\sigma(t_k),\Delta\tilde{v}_f^\sigma(t_k))$ of the current estimate $(\tilde{u}_f^\sigma(t_k),\tilde{v}_f^\sigma(t_k))$ of the velocity vector field is achieved by solving the system of linear equations which is the linearization of this system of nonlinear equations about the current estimate $(\tilde{u}_f^\sigma(t_k),(\tilde{v}_f^\sigma(t_k))$ of the velocity vector field. The iterative improvement $(\Delta\tilde{u}_f^\sigma(t_k),\Delta\tilde{v}_f^\sigma(t_k))$ of the current estimate $(\tilde{u}_f^\sigma(t_k),(\tilde{v}_f^\sigma(t_k))$ of the velocity vector field is added to the current estimate $(\tilde{u}_f^\sigma(t_k),\tilde{v}_f^\sigma(t_k))$ of the velocity vector field to obtain a new current estimate of the velocity vector field and the above process of the iterative improvement of the current estimate $(\tilde{u}_f^\sigma(t_k),\tilde{v}_f^\sigma(t_k))$ of the velocity vector field is repeated until the system of nonlinear equations relative to the current estimate $(\tilde{u}_f^\sigma(t_k),\tilde{v}_f^\sigma(t_k))$ of the velocity vector field is properly satisfied at which point the current estimate $(\tilde{u}_f^\sigma(t_k),\tilde{v}_f^\sigma(t_k))$ of the velocity vector field is taken as the final estimate $(\tilde{u}_{f,1}^\sigma(t_k),\tilde{v}_{f,1}^\sigma(t_k))$ of the velocity vector field at the resolution level $\sigma$.

For every f=1, . . . , F, every $\sigma=\sigma_1, \ldots, \sigma_M$, and every k=1, . . . , K, the system of nonlinear equations relative to the unknown current estimate $(\tilde{u}_f^\sigma(t_k),\tilde{v}_f^\sigma(t_k))$ of the velocity vector field is defined in terms of the unknown current estimate $(\tilde{u}_f^\sigma(t_k),\tilde{v}_f^\sigma(t_k))$ of the velocity vector field, and in terms of the quantities related to the values of previous and next images of the given time-varying image sequence and to the values of the generalized spatial partial derivatives of previous and next images of the given time-varying image sequence. The quantities related to the values of the previous image of the given time-varying image sequence, called the previous filtered image function and denoted as $g^\sigma(x,y,t_P)$, and the quantities related to the values of the next image of the given time-varying image sequence, called the next filtered image function and denoted as $g^\sigma(x,y,t_Q)$, are obtained by selectively, with respect to the partitioning, filtering each band of previous and next images with two filters: the horizontal derivative of the Gaussian-like filter and the vertical derivative of the Gaussian-like filter. The selective, with respect to the partitioning, filtering of previous and next images is defined in the next section as the filtering that does not mix the image values at the image points belonging to different regions of the respective grid partitioning. The quantities related to the values of the generalized x-spatial partial derivative of the previous image of the given time-varying image sequence, called the x-spatial partial derivative of the previous filtered image function and denoted as $g_x^\sigma(x,y,t_P)$, and the quantities related to the values of the generalized x-spatial partial derivative of the next image of the given time-varying image sequence, called the x-spatial partial derivative of the next filtered image function and denoted as $g_x^\sigma(x,y,t_Q)$, are obtained by selectively, with respect to the partitioning, filtering each band of previous and next images with the x-spatial partial derivative of each of the above two filters. The quantities related to the values of the generalized y-spatial partial derivative of the previous image of the given time-varying image sequence, called the y-spatial partial derivative of the previous filtered image function and denoted as $g_y^\sigma(x,y,t_P)$, and the quantities related to the values of the generalized y-spatial partial derivative of the next image of the given time-varying image sequence, called the y-spatial partial derivative of the next filtered image function and denoted as $g_y^\sigma(x,y,t_Q)$, are obtained by selectively, with respect to the partitioning, filtering each band of previous and next images with the y-spatial partial derivative of each of the above two filters.

For each $t=t_P, t_Q$, the grid of all points on the image plane generated by the vectors $h_{t,1}, h_{t,2}$ is denoted by the symbol $H(h_{t,1},h_{t,2})$. The symbol G is used for the set of indices with each index $g \in G$ specifying a particular band and a particular filter. For each time moment $t=t_P, t_Q$, each resolution level $\sigma=\sigma_1, \ldots, \sigma_M$, and each index $g \in G$, the filter function is denoted by the symbol $\phi_g^\sigma(x,y,t)$. In the case of the horizontal derivative of the Gaussian-like filter, the filter function $\phi_g^\sigma(x,y,t)$ is defined by the relation $$\phi_g^\sigma(x, y, t) = \tag{3-1}$$

$$\frac{x\exp((\alpha_\sigma^2 x^2 + \beta_\sigma^2 y^2)/(\alpha_\sigma^2 x^2 + \beta_\sigma^2 y^2 - \omega^2))}{\underset{\alpha_\sigma^2 x^2 + \beta_\sigma^2 y^2 < \omega^2}{\sum\sum_{(x,y)\in H(h_{t,1},h_{t,2})}} \exp((\alpha_\sigma^2 x^2 + \beta_\sigma^2 y^2)/(\alpha_\sigma^2 x^2 + \beta_\sigma^2 y^2 - \omega^2))},$$

for every $(x,y)\in H(h_{t,1},h_{t,2})$, such that $\alpha_\sigma^2 x^2+\beta_\sigma^2 y^2<\omega^2$; while in the case of the vertical derivative of the Gaussian-like filter, the filter function $\phi_g^\sigma(x,y,t)$ is defined by the relation $$\phi_g^\sigma(x, y, t) = \tag{3-2}$$

$$\frac{y\exp((\alpha_\sigma^2 x^2 + \beta_\sigma^2 y^2)/(\alpha_\sigma^2 x^2 + \beta_\sigma^2 y^2 - \omega^2))}{\underset{\alpha_\sigma^2 x^2 + \beta_\sigma^2 y^2 < \omega^2}{\sum\sum_{(x,y)\in H(h_{t,1},h_{t,2})}} \exp((\alpha_\sigma^2 x^2 + \beta_\sigma^2 y^2)/(\alpha_\sigma^2 x^2 + \beta_\sigma^2 y^2 - \omega^2))},$$

for every $(x,y)\in H(h_{t,1},h_{t,2})$, such that $\alpha_\sigma^2 x^2+\beta_\sigma^2 y^2<\omega^2$. Here $\alpha_\sigma, \beta_\sigma$ and $\omega$ are positive constants. At the coarsest resolution level the constants $\alpha_\sigma, \beta_\sigma$ are set to a relatively small value, and at each finer resolution level the constants $\alpha_\sigma, \beta_\sigma$ are set to the increased by a fixed multiplicative factor values of the constants $\alpha_\sigma, \beta_\sigma$ at the coarser resolution level.

For each $\sigma=\sigma_1, \ldots, \sigma_M$, the previous filtered image functions $g^\sigma(x,y,t_P)$, $g \in G$, the x-spatial partial derivatives of the previous filtered image functions $g_x^\sigma(x,y,t_P)$, $g \in G$, and the y-spatial partial derivatives of the previous filtered image functions $g_y^\sigma(x,y,t_P)$, $g \in G$ are defined on the subgrid $\Omega_{t_P}^\sigma$ of the grid of points $\Omega_{t_P}$ on the image plane, which is generated by some vectors $h_{t_P,1}^\sigma$ and $h_{t_P,2}^\sigma$, with the property: for every $(x_1,y_1)\in \Omega_{t_P}^\sigma$ and every $(x_2,y_2)\in H(h_{t_P,1}^\sigma,h_{t_P,2}^\sigma)$, such that $\alpha_\sigma^2 x_2^2+\beta_\sigma^2 y_2^2<\omega^2$, the point $(x,y)=(x_1,y_1)+(x_2,y_2)$ belongs to the grid $\Omega_{t_P}$. For each $\sigma=\sigma_1, \ldots, \sigma_M$, the next filtered image functions $g^\sigma(x,y,t_Q)$, $g \in G$, the x-spatial partial derivatives of the next filtered image functions $g_x^\sigma(x,y,t_Q)$, $g \in G$, and the y-spatial partial derivatives of the next filtered image functions $g_y^\sigma(x,y,t_Q)$, $g \in G$ are defined on the subgrid $\Omega_{t_Q}^\sigma$ of the grid of points $\Omega_{t_Q}$ on the image plane, which is generated by some vectors $h_{t_Q,1}^\sigma$ and $h_{t_Q,2}^\sigma$, with the property: for every $(x_1,y_1)\in \Omega_{t_Q}^\sigma$ and every $(x_2,y_2)\in H(h_{t_Q,1}^\sigma,h_{t_Q,2}^\sigma)$, such that $\alpha_\sigma^2 x_2^2+\beta_\sigma^2 y_2^2<\omega^2$, the point $(x,y)=(x_1,y_1)+(x_2,y_2)$ belongs to the grid $\Omega_{t_Q}$.

The multi-level resolution process is build around a multi-level resolution pyramid meaning that on each coarser resolution level the previous filtered image functions and their spatial partial derivatives, the next filtered image functions and their spatial partial derivatives, and the estimates of the velocity vector fields are defined on subgrids of the corresponding grids at a finer resolution level. The grid rotation method, which complies with the requirements of the resolution pyramid, is used to define the grids $\Omega_{t_P}^\sigma, \Omega_{t_Q}^\sigma, \Omega_{t_k}^\sigma$, k=1, . . . , K, $\sigma=\sigma_1, \ldots, \sigma_M$. In this method, the grids are constructed sequentially starting with the finest resolution level and preceding towards the coarsest resolution level. The grids of the coarser resolution level are obtained from the grids of the finer resolution level by omiting the even grid points on the odd grid lines and by omiting the odd grid points on the even grid lines, and thereby rotating the grid lines of the grids of the finer resolution level by 45 degree. More precisely, these grids are defined as follows: for every $t=t_P, t_Q, t_1, \ldots, t_K$, m=2, . . . , M, the grid $\Omega_t^{\sigma_m}$ is sequentially defined as the subgrid of the grid $\Omega_t^{\sigma_{m-1}}$ generated by the vectors $h_{t,1}^{\sigma_m}, h_{t,2}^{\sigma_m}$, where the vectors $h_{t,1}^{\sigma_m}, h_{t,2}^{\sigma_m}$ are defined by the relation $$h_{t,1}^{\sigma_m} = h_{t,1}^{\sigma_{m-1}} + h_{t,2}^{\sigma_{m-1}},$$

$$h_{t,2}^{\sigma_m} = h_{t,1}^{\sigma_{m-1}} - h_{t,2}^{\sigma_{m-1}}. \quad (3\text{-}3)$$

The proposed method of computing the estimates of the velocity vector fields, $(\tilde{u}(t_k), \tilde{v}(t_k))$, $k=1, \ldots, K$, can be summarized as the follows:

1. Start with the label value F taken as the current label value f.
2. Start with the coarsest resolution level $\sigma_M$ taken as the current resolution level $\sigma$.
3. In the case of the current resolution level $\sigma$ being the coarsest resolution level $\sigma_M$, set the initial estimate ($\tilde{u}_{f,0}{}^\sigma(t_k), \tilde{v}_{f,0}{}^\sigma(t_k)$) of the velocity vector field to some given (for example, constant) value, for every $k=1, \ldots, K$; otherwise project the final estimate ($\tilde{u}_{f,1}{}^{\delta(\sigma)}(t_k), \tilde{v}_{f,1}{}^{\delta(\sigma)}(t_k)$) of the velocity vector field at the previous coarser resolution level $\delta(\sigma) = \sigma_{m+1}$ to the current resolution level $\sigma = \sigma_m$ to obtain the initial estimate ($\tilde{u}_{f,0}{}^\sigma(t_k), \tilde{v}_{f,0}{}^\sigma(t_k)$) of the velocity vector field at the current resolution level $\sigma$, for every $k=1, \ldots, K$. Take the initial estimate ($\tilde{u}_{f,0}{}^\sigma(t_k), \tilde{v}_{f,0}{}^\sigma(t_k)$) of the velocity vector field at the current resolution level as the current estimate ($\tilde{u}_f{}^\sigma(t_k), \tilde{v}_f{}^\sigma(t_k)$) of the velocity vector field at the current resolution level $\sigma$, for every $k=1, \ldots, K$.
4. Iteratively improve the current estimate ($\tilde{u}_f{}^\sigma(t_k), \tilde{v}_f{}^\sigma(t_k)$) of the velocity vector field to obtain the final estimate ($\tilde{u}_{f,1}{}^\sigma(t_k), \tilde{v}_{f,1}{}^\sigma(t_k)$) of the velocity vector field at the current resolution level $\sigma$, for every $k=1, \ldots, K$.
5. Take the next finer resolution level $\sigma_{m-1}$ as the current resolution level $\sigma$.
6. Repeat step 3 to step 5 until the finest resolution level $\sigma = \sigma_1$ is reached.
7. Take the next smaller label value $f-1$ as the current label value f.
8. Repeat step 2 to step 7 until the smallest label value $f=1$ is reached.
9. Bilinearly interpolate the final estimate ($\tilde{u}_{f,1}{}^\sigma(t_k), \tilde{v}_{f,1}{}^\sigma(t_k)$) of the finest resolution level $\sigma = \sigma_1$ to the grid of points $\Omega_{t_k}$ on the image plane to obtain the estimate ($\tilde{u}_f(t_k), \tilde{v}_f(t_k)$) of the velocity vector field corresponding to the label value f and to the missing image at the time moment $t_k$, for every $f=1, \ldots, F$, and every $k=1, \ldots, K$.
10. Combine the estimates ($\tilde{u}_f(t_k), \tilde{v}_f(t_k)$), $f=1, \ldots, F$ of the velocity vector field to obtain the estimate ($\tilde{u}(t_k), \tilde{v}(t_k)$) of the velocity vector field, for every $k=1, \ldots, K$.

IV. Computation of the Filtered Image Functions

For a given time moment $t = t_P, t_Q$, and for every resolution level $\sigma = \sigma_1, \ldots, \sigma_M$, let the sequence of the subgrids $\Omega_{t,f}{}^\sigma$, $f=1, \ldots, F$ of the grid $\Omega_t{}^\sigma$ be the disjoint partitioning of the grid $\Omega_t{}^\sigma$ defined in terms of the disjoint partitioning $\Omega_{t,f}$, $f=1, \ldots, F$ of the grid $\Omega_t$ as follows. For every $f=1, \ldots, F$, let $\Gamma_{t,f}{}^\sigma$ be the subgrid of the grid $\Omega_t{}^\sigma$ consisting of the image points $(x,y) = (x_1, y_1) + (x_2, y_2)$, for every $(x_1, y_1) \in \Omega_{t,f} \cap \Omega_t{}^\sigma$ and every $(x_2, y_2) \in H(h_{t,1}{}^\sigma, h_{t,2}{}^\sigma)$ such that $\alpha_\sigma^2 x_2^2 + \beta_\sigma^2 y_2^2 < \omega^2$. Then for every $f=1, \ldots, F$, $\Omega_{t,f}{}^\sigma$ is defined as the subgrid of the grid $\Omega_t{}^\sigma$ consisting of those points of the union of the subgrids $\Gamma_{t,f}{}^\sigma, \ldots, \Gamma_{t,F}{}^\sigma$ that do not belong to the union of the subgrids $\Gamma_{t,f+1}{}^\sigma, \ldots, \Gamma_{t,F}{}^\sigma$.

For each time moment $t = t_P, t_Q$, each resolution level $\sigma = \sigma_1, \ldots, \sigma_M$, each label $f=1, \ldots, F$, each index $g \in G$, and each image point $(x,y) \in \Omega_{t,f}{}^\sigma$, the value $g^\sigma(x,y,t)$ of the filtered image function is given by the relation $$g^\sigma(x,y,t) = \sum_{\substack{(x',y') \in \Omega_t \\ \alpha_\sigma^2(x'-x)^2 + \beta_\sigma^2(y'-y)^2 < \sigma^2}} I_{t,f,b_g}(x',y') \phi_g^\sigma(x'-x, y'-y, t), \quad (4\text{-}1)$$

the value $g_x{}^\sigma(x,y,t)$ of the x-spatial partial derivative of the filtered image function $g^\sigma(x,y,t)$ is given by the relation $$g_x^\sigma(x,y,t) = \sum_{\substack{(x',y') \in \Omega_t \\ \alpha_\sigma^2(x'-x)^2 + \beta_\sigma^2(y'-y)^2 < \sigma^2}} I_{t,f,b_g}(x',y') \frac{\partial}{\partial x} \phi_g^\sigma(x'-x, y'-y, t), \quad (4\text{-}2)$$

the value $g_y{}^\sigma(x,y,t)$ of the y-spatial partial derivative of the filtered image function $g^\sigma(x,y,t)$ is given by the relation $$g_y^\sigma(x,y,t) = \sum_{\substack{(x',y') \in \Omega_t \\ \alpha_\sigma^2(x'-x)^2 + \beta_\sigma^2(y'-y)^2 < \sigma^2}} I_{t,f,b_g}(x',y') \frac{\partial}{\partial y} \phi_g^\sigma(x'-x, y'-y, t), \quad (4\text{-}3)$$

where: $b_g$ is the band corresponding to the index g, and the function $I_{t,f,b_g}(x',y')$ is equal to the image function $I_{t,b_g}(x',y')$ for every $(x',y') \in \Omega_{t,f}$ and is equal to zero otherwise.

V. Optical Flow and Directional Smoothness Constraints

For each $k=1, \ldots, K$, each $\sigma = \sigma_1, \ldots, \sigma_M$, and each $f=1, \ldots, F$, the system of nonlinear equations relative to the unknown current estimate ($\tilde{u}_f{}^\sigma(t_k), \tilde{v}_f{}^\sigma(t_k)$) of the velocity vector field forms a compromise between optical flow and directional smoothness constraints. The optical flow constraints, represented by optical flow functions and their spatial partial derivatives, relate the values of the next and previous filtered image functions at the corresponding image points. The directional smoothness constraints, represented by the directional smoothness functions, relate the values of neighboring velocity vectors.

For each index $g \in G$ specifying a particular filter and a particular image band, for the following three functions defined on the grid of image points $(x,y) \in \Omega_{t_k}{}^\sigma$: an optical flow function $\tilde{g}_t{}^\sigma(f, x, y, t_k, \tilde{u}_f{}^\sigma(x,y,t_k), \tilde{v}_f{}^\sigma(x,y,t_k))$, a spatial partial with respect to the component $\tilde{u}_f{}^\sigma(x,y,t_k)$ of the velocity vector derivative $\tilde{g}_{t\tilde{u}}{}^\sigma(f, x, y, t_k, \tilde{u}_f{}^\sigma(x,y,t_k), \tilde{v}_f{}^\sigma(x,y,t_k))$ of the optical flow function $\tilde{g}_t{}^\sigma(f, x, y, t_k, \tilde{u}_f{}^\sigma(x,y,t_k), \tilde{v}_f{}^\sigma(x,y,t_k))$, and a spatial partial with respect to the component $\tilde{v}_f{}^\sigma(x,y,t_k)$ of the velocity vector derivative $\tilde{g}_{t\tilde{v}}{}^\sigma(f, x, y, t_k, \tilde{u}_f{}^\sigma(x,y,t_k), \tilde{v}_f{}^\sigma(x,y,t_k))$ of the optical flow function $\tilde{g}_t{}^\sigma(f, x, y, t_k, \tilde{u}_f{}^\sigma(x,y,t_k), \tilde{v}_f{}^\sigma(x,y,t_k))$. The value of the optical flow function $\tilde{g}_t{}^\sigma(f, x, y, t_k, \tilde{u}_f{}^\sigma(x,y,t_k), \tilde{v}_f{}^\sigma(x,y,t_k))$ is equal to the scaled by the factor $1/(t_Q - t_P)$ difference between the estimated next filtered image function and the estimated previous filtered image function at the points $(x,y)$ of the grid $\Omega_{t_k}{}^\sigma$ where both the estimate next filtered image function and the estimated previous filtered image function are defined and equal to zero otherwise. The value of the spatial partial with respect to the component $\tilde{u}_f{}^\sigma(x,y,t_k)$ of the velocity vector derivative $\tilde{g}_{t\tilde{u}}{}^\sigma(f, x, y, t_k, \tilde{u}_f{}^\sigma(x,y,t_k), \tilde{v}_f{}^\sigma(x,y,t_k))$ of the optical flow function is equal to the sum of the scaled by the factor $(t_Q - t_k)/(t_Q - t_P)$ spatial partial with respect to the component x derivative of the estimated next filtered image function and the scaled by the factor $(t_k-t_P)/(t_Q-t_P)$ spatial partial with respect to the component x derivative of the estimated previous filtered image function at the points (x,y) of the grid $\Omega_{t_k}^\sigma$ where both the spatial partial with respect to the component x derivative of the estimated next filtered image function and the spatial partial with respect to the component x derivative of the estimated previous filtered image function are defined and equal to zero otherwise. The value of the spatial partial with respect to the component $\tilde{v}_f^\sigma(x,y,t_k)$ of the velocity vector derivative $\tilde{g}_{t\tilde{v}}^\sigma(f,x,y,t_k,\tilde{u}_f^\sigma(x,y,t_k),\tilde{v}_f^\sigma(x,y,t_k))$ of the optical flow function is equal to the sum of the scaled by the factor $(t_Q-t_k)/(t_Q-t_P)$ spatial partial with respect to the component y derivative of the estimated next filtered image function and the scaled by the factor $(t_k-t_P)/(t_Q-t_P)$ spatial partial with respect to the component y derivative of the estimated previous filtered image function at the points (x,y) of the grid $\Omega_{t_k}^\sigma$ where both the spatial partial with respect to the component y derivative of the estimated next filtered image function and the spatial partial with respect to the component y derivative of the estimated previous filtered image function are defined and equal to zero otherwise.

To obtain the estimated next filtered image function, the spatial partial with respect to the component x derivative of the estimated next filtered image function, and the spatial partial with respect to the component y derivative of the estimated next filtered image function, find the grid of image points $\Omega_{t_Q}^\sigma(\tilde{u}_f^\sigma(t_k),\tilde{v}_f^\sigma(t_k))$, which are the taken at the time moment $t_Q$ estimated perspective projections onto the image plane of the visible points in the scene, whose perspective projections onto the image plane at the time moment $t_k$ are the grid points $\Omega_{t_k}^\sigma$; and then bilinearly interpolate the next filtered image function $g^\sigma(x,y,t_Q)$, the spatial partial with respect to the component x derivative $g_x^\sigma(x,y,t_Q)$ of the next filtered image function, and the spatial partial with respect to the component y derivative $g_y^\sigma(x,y,t_Q)$ of the next filtered image function, from the grid of points $\Omega_{t_Q}^\sigma$ to those points of the grid $\Omega_{t_Q}^\sigma(\tilde{u}_f^\sigma(t_k),\tilde{v}_f^\sigma(t_k))$ that are surrounded by the points of the grid $\Omega_{t_Q,f}^\sigma$. To obtain the estimated previous filtered image function, the spatial partial with respect to the component x derivative of the estimated previous filtered image function, and the spatial partial with respect to the component y derivative of the estimated previous filtered image function, find the grid of image points $\Omega_{t_P}^\sigma(\tilde{u}_f^\sigma(t_k),\tilde{v}_f^\sigma(t_k))$, which are the taken at the time moment $t_P$ estimated perspective projections onto the image plane of the visible points in the scene, whose perspective projections onto the image plane at the time moment $t_k$ are the grid points $\Omega_{t_k}^\sigma$; and then bilinearly interpolate the previous filtered image function $g^\sigma(x,y,t_P)$, the spatial partial with respect to the component x derivative $g_x^\sigma(x,y,t_P)$ of the previous filtered image function, and the spatial partial with respect to the component y derivative $g_y^\sigma(x,y,t_P)$ of the previous filtered image function, from the grid of points $\Omega_{t_P}^\sigma$ to those points of the grid $\Omega_{t_P}^\sigma(\tilde{u}_f^\sigma(t_k),\tilde{v}_f^\sigma(t_k))$ that are surrounded by the points of the grid $\Omega_{t_P,f}^\sigma$. To obtain the grid of image points $\Omega_{t_Q}^\sigma(\tilde{u}_f^\sigma(t_k),\tilde{v}_f^\sigma(t_k))$, each image point of the grid $\Omega_{t_k}^\sigma$ is shifted by the amount equal to the scaled by the factor $(t_Q-t_k)$ value of the estimated velocity vector defined at that grid point. To obtain the grid of image points $\Omega_{t_P}^\sigma(\tilde{u}_f^\sigma(t_k),\tilde{v}_f^\sigma(t_k))$, each image point of the grid $\Omega_{t_k}^\sigma$ is shifted by the amount equal to the scaled by the factor $(t_P-t_k)$ value of the estimated velocity vector defined at that grid point.

Let (x,y) be an image point from the grid $\Omega_{t_k}^\sigma$ where the estimated next filtered image function, its spatial partial with respect to the component x and to the component y derivatives, the estimated previous filtered image function, and its spatial partial with respect to the component x and to the component y derivatives are all defined, then the value $\tilde{g}_t^\sigma(f,x,y,t_k,\tilde{u}_f^\sigma(x,y,t_k),\tilde{v}_f^\sigma(x,y,t_k))$ of the optical flow function, the value $\tilde{g}_{t\tilde{u}}^\sigma(f,x,y,t_k,\tilde{u}_f^\sigma(x,y,t_k),\tilde{v}_f^\sigma(x,y,t_k))$ of the spatial partial with respect to the component $\tilde{u}_f^\sigma(x,y,t_k)$ of the velocity vector derivative of the optical flow function and the value $\tilde{g}_{t\tilde{v}}^\sigma(f,x,y,t_k,\tilde{u}_f^\sigma(x,y,t_k),\tilde{v}_f^\sigma(x,y,t_k))$ of the spatial partial with respect to the component $\tilde{v}_f^\sigma(x,y,t_k)$ of the velocity derivative of the optical flow function at the image point (x,y) can be more precisely defined as follows. The point $(x+(t_Q-t_k)\tilde{u}_f^\sigma(x,y,t_k),y+(t_Q-t_k)\tilde{v}_f^\sigma(x,y,t_k))$ of the grid $\Omega_{t_Q}^\sigma(\tilde{u}_f^\sigma(t_k),\tilde{v}_f^\sigma(t_k))$ can be expressed in the following form $$(x+(t_Q-t_k)\tilde{u}_f^\sigma(x,y,t_k),y+(t_Q-t_k)\tilde{v}_f^\sigma(x,y,t_k))=(i_{t_Q,1}^\sigma+\theta_{t_Q,1}^\sigma)h_{t_Q,1}^\sigma+ \\ (i_{t_Q,2}^\sigma+\theta_{t_Q,2}^\sigma)h_{t_Q,2}^\sigma. \quad (5\text{-}1)$$

for some integer numbers $i_{t_Q,1}^\sigma$, $i_{t_Q,2}^\sigma$ and for some real numbers $\theta_{t_Q,1}^\sigma$, $\theta_{t_Q,2}^\sigma$ from the interval [0,1]. The fact that the estimated next filtered image function and its spatial partial with respect to the component x and to the component y derivatives are defined at the point (x,y) means that the point $(x+(t_Q-t_k)\tilde{u}_f^\sigma(x,y,t_k),y+(t_Q-t_k)\tilde{v}_f^\sigma(x,y,t_k))$ of the grid $\Omega_{t_Q}^\sigma(\tilde{u}_f^\sigma(t_k),\tilde{v}_f^\sigma(t_k))$ is surrounded by the following points of the grid $\Omega_{t_Q,f}^\sigma$:

$$(x_{t_Q,1},y_{t_Q,1})=i_{t_Q,1}^\sigma h_{t_Q,1}^\sigma+i_{t_Q,2}^\sigma h_{t_Q,2}^\sigma, \quad (5\text{-}2)$$

$$(x_{t_Q,2},y_{t_Q,2})=(i_{t_Q,1}^\sigma+1)h_{t_Q,1}^\sigma+i_{t_Q,2}^\sigma h_{t_Q,2}^\sigma, \quad (5\text{-}3)$$

$$(x_{t_Q,3},y_{t_Q,3})=i_{t_Q,1}^\sigma h_{t_Q,1}^\sigma+(i_{t_Q,2}^\sigma+1)h_{t_Q,2}^\sigma, \quad (5\text{-}4)$$

$$(x_{t_Q,4},y_{t_Q,4})=(i_{t_Q,1}^\sigma+1)h_{t_Q,1}^\sigma+(i_{t_Q,2}^\sigma+1)h_{t_Q,2}^\sigma. \quad (5\text{-}5)$$

The point $(x+(t_P-t_k)\tilde{u}_f^\sigma(x,y,t_k),y+(t_P-t_k)\tilde{v}_f^\sigma(x,y,t_k))$ of the grid $\Omega_{t_P}^\sigma(\tilde{u}_f^\sigma(t_k),\tilde{v}_f^\sigma(t_k))$ can be expressed in the following form $$(x+(t_P-t_k)\tilde{u}_f^\sigma(x,y,t_k),y+(t_P-t_k) \\ \tilde{v}_f^\sigma(x,y,t_k))=(i_{t_P,1}^\sigma+\theta_{t_P,1}^\sigma)h_{t_P,1}^\sigma+(i_{t_P,2}^\sigma+\theta_{t_P,2}^\sigma)h_{t_P,2}^\sigma. \quad (5\text{-}6)$$

for some integer numbers $i_{t_P,1}^\sigma$, $i_{t_P,2}^\sigma$ and for some real numbers $\theta_{t_P,1}^\sigma$, $\theta_{t_P,2}^\sigma$ from the interval [0,1]. The fact that the estimated previous filtered image function and its spatial partial with respect to the component x and to the component y derivatives are defined at the point (x,y) means that the point $(x+(t_P-t_k)\tilde{u}_f^\sigma(x,y,t_k),y+(t_P-t_k)\tilde{v}_f^\sigma(x,y,t_k))$ of the grid $\Omega_{t_P}^\sigma(\tilde{u}_f^\sigma(t_k),\tilde{v}_f^\sigma(t_k))$ is surrounded by the following points of the grid $\Omega_{t_P,f}^\sigma$:

$$(x_{t_P,1},y_{t_P,1})=i_{t_P,1}^\sigma h_{t_P,1}^\sigma+i_{t_P,2}^\sigma h_{t_P,2}^\sigma, \quad (5\text{-}7)$$

$$(x_{t_P,2},y_{t_P,2})=(i_{t_P,1}^\sigma+1)h_{t_P,1}^\sigma+i_{t_P,2}^\sigma h_{t_P,2}^\sigma, \quad (5\text{-}8)$$

$$(x_{t_P,3},y_{t_P,3})=i_{t_P,1}^\sigma h_{t_P,1}^\sigma+(i_{t_P,2}^\sigma+1)h_{t_P,2}^\sigma, \quad (5\text{-}9)$$

$$(x_{t_P,4},y_{t_P,4})=(i_{t_P,1}^\sigma+1)h_{t_P,1}^\sigma+(i_{t_P,2}^\sigma+1)h_{t_P,2}^\sigma. \quad (5\text{-}10)$$

The value $\tilde{g}_t^\sigma(f,x,y,t_k,\tilde{u}_f^\sigma(x,y,t_k),\tilde{v}_f^\sigma(x,y,t_k))$ of the optical flow function at the image point (x,y) is given by the relation $$\tilde{g}_t^\sigma(f,x,y,t_k,\tilde{u}_f^\sigma(x,y,t_k),\tilde{v}_f^\sigma(x,y,t_k)) = \quad (5\text{-}11)$$
$$(\tilde{g}^\sigma(x+(t_Q-t_k)\tilde{u}_f^\sigma(x,y,t_k),y+(t_Q-t_k)\tilde{v}_f^\sigma(x,y,t_k),t_Q)-$$
$$\tilde{g}^\sigma(x+(t_P-t_k)\tilde{u}_f^\sigma(x,y,t_k),y+$$
$$(t_P-t_k)\tilde{v}_f^\sigma(x,y,t_k),t_P))/(t_Q-t_P);$$

where the value $\tilde{g}^\sigma(x+(t_Q-t_k)\tilde{u}_f^\sigma(x,y,t_k),y+(t_Q-t_k)\tilde{v}_f^\sigma(x,y,t_k),t_Q)$ of the estimated next filtered image function is given as the following bilinear interpolation $$\tilde{g}^\sigma(x+(t_Q-t_k)\tilde{u}_f^\sigma(x,y,t_k), y+(t_Q-t_k)\tilde{v}_f^\sigma(x,y,t_k), t_Q) = \quad (5\text{-}12)$$
$$(1-\theta_{t_Q,2}^\sigma)((1-\theta_{t_Q,1}^\sigma)g^\sigma(x_{t_Q,1}, y_{t_Q,1}, t_Q) +$$
$$\theta_{t_Q,1}^\sigma g^\sigma(x_{t_Q,2}, y_{t_Q,2}, t_Q)) +$$
$$\theta_{t_Q,2}^\sigma((1-\theta_{t_Q,1}^\sigma)g^\sigma(x_{t_Q,3}, y_{t_Q,3}, t_Q) + \theta_{t_Q,1}^\sigma g^\sigma(x_{t_Q,4}, y_{t_Q,4}, t_Q)),$$

of the values of the next filtered image function at the image points defined by the relations (5-2), (5-3), (5-4), (5-5); while the value $\tilde{g}^\sigma(x+(t_P-t_k)\tilde{u}_f^\sigma(x,y,t_k),y+(t_P-t_k)\tilde{v}_f^\sigma(x,y,t_k),t_P)$ of the estimated previous filtered image function is given as the following bilinear interpolation $$\tilde{g}^\sigma(x+(t_P-t_k)\tilde{u}_f^\sigma(x,y,t_k), y+(t_P-t_k)\tilde{v}_f^\sigma(x,y,t_k), t_P) = \quad (5\text{-}13)$$
$$(1-\theta_{t_P,2}^\sigma)((1-\theta_{t_P,1}^\sigma)g^\sigma(x_{t_P,1}, y_{t_P,1}, t_P) +$$
$$\theta_{t_P,1}^\sigma g^\sigma(x_{t_P,2}, y_{t_P,2}, t_P)) +$$
$$\theta_{t_P,2}^\sigma((1-\theta_{t_P,1}^\sigma)g^\sigma(x_{t_P,3}, y_{t_P,3}, t_P) + \theta_{t_P,1}^\sigma g^\sigma(x_{t_P,4}, y_{t_P,4}, t_P)).$$

of the values of the previous filtered image function at the image points defined by the relations (5-7), (5-8), (5-9), (5-10). The value $\tilde{g}_{\tilde{u}}^\sigma(f,x,y,t_k,\tilde{u}_f^\sigma(x,y,t_k),\tilde{v}_f^\sigma(x,y,t_k))$ of the spatial partial with respect to the component $\tilde{u}_f^\sigma(x,y,t_k)$ of the velocity vector derivative of the optical flow function at the image point (x,y) is given by the relation $$\tilde{g}_{\tilde{u}}^\sigma(f, x, y, t_k, \tilde{u}_f^\sigma(x, y, t_k), \tilde{v}_f^\sigma(x, y, t_k)) = ((t_Q - t_k) \quad (5\text{-}14)$$
$$\tilde{g}_x^\sigma(x+(t_Q-t_k)\tilde{u}_f^\sigma(x,y,t_k), y+(t_Q-t_k)\tilde{v}_f^\sigma(x,y,t_k), t_Q) +$$
$$(t_k - t_P)\tilde{g}_x^\sigma(x+(t_P-t_k)\tilde{u}_f^\sigma(x,y,t_k), y+(t_P-t_k)\tilde{v}_f^\sigma(x,y,t_k),$$
$$t_P))/(t_Q-t_P);$$

where the value $\tilde{g}_x^\sigma(x+(t_Q-t_k)\tilde{u}_f^\sigma(x,y,t_k),y+(t_Q-t_k)\tilde{v}_f^\sigma(x,y,t_k),t_Q)$ of the spatial partial with respect to the component x derivative of the estimated next filtered image function is given as the following bilinear interpolation $$\tilde{g}_x^\sigma(x+(t_Q-t_k)\tilde{u}_f^\sigma(x,y,t_k), y+(t_Q-t_k)\tilde{v}_f^\sigma(x,y,t_k), t_Q) = \quad (5\text{-}15)$$
$$(1-\theta_{t_Q,2}^\sigma)((1-\theta_{t_Q,1}^\sigma)g_x^\sigma(x_{t_Q,1}, y_{t_Q,1}, t_Q) +$$
$$\theta_{t_Q,1}^\sigma g_x^\sigma(x_{t_Q,2}, y_{t_Q,2}, t_Q)) +$$
$$\theta_{t_Q,2}^\sigma((1-\theta_{t_Q,1}^\sigma)g_x^\sigma(x_{t_Q,3}, y_{t_Q,3}, t_Q) + \theta_{t_Q,1}^\sigma g_x^\sigma(x_{t_Q,4}, y_{t_Q,4}, t_Q)),$$

of the values of the spatial partial with respect to the component x derivative of the next filtered image function at the image points defined by the relations (5-2), (5-3), (5-4), (5-5); while the value $\tilde{g}_x^\sigma(x+(t_P-t_k)\tilde{u}_f^\sigma(x,y,t_k),y+(t_P-t_k)\tilde{v}_f^\sigma(x,y,t_k),t_P)$ of the spatial partial with respect to the component x derivative of the estimated previous filtered image function is given as the following bilinear interpolation $$\tilde{g}_x^\sigma(x+(t_P-t_k)\tilde{u}_f^\sigma(x,y,t_k), y+(t_P-t_k)\tilde{v}_f^\sigma(x,y,t_k), t_P) = \quad (5\text{-}16)$$
$$(1-\theta_{t_P,2}^\sigma)((1-\theta_{t_P,1}^\sigma)g_x^\sigma(x_{t_P,1}, y_{t_P,1}, t_P) +$$
$$\theta_{t_P,1}^\sigma g_x^\sigma(x_{t_P,2}, y_{t_P,2}, t_P)) +$$
$$\theta_{t_P,2}^\sigma((1-\theta_{t_P,1}^\sigma)g_x^\sigma(x_{t_P,3}, y_{t_P,3}, t_P) + \theta_{t_P,1}^\sigma g_x^\sigma(x_{t_P,4}, y_{t_P,4}, t_P)).$$

of the values of the spatial partial with respect to the component x derivative of the previous filtered image function at the image points defined by the relations (5-7), (5-8), (5-9), (5-10). The value $\tilde{g}_{\tilde{v}}^\sigma(f,x,y,t_k,\tilde{u}_f^\sigma(x,y,t_k),\tilde{v}_f^\sigma(x,y,t_k))$ of the spatial partial with respect to the component $\tilde{v}_f^\sigma(x,y,t_k)$ of the velocity vector derivative of the optical flow function at the image point (x,y) is given by the relation $$\tilde{g}_{\tilde{v}}^\sigma(f, x, y, t_k, \tilde{u}_f^\sigma(x, y, t_k), \tilde{v}_f^\sigma(x, y, t_k)) = ((t_Q - t_k) \quad (5\text{-}17)$$
$$\tilde{g}_y^\sigma(x+(t_Q-t_k)\tilde{u}_f^\sigma(x,y,t_k), y+(t_Q-t_k)\tilde{v}_f^\sigma(x,y,t_k), t_Q) +$$
$$(t_k - t_P)\tilde{g}_y^\sigma(x+(t_P-t_k)\tilde{u}_f^\sigma(x,y,t_k), y+(t_P-t_k)\tilde{v}_f^\sigma(x,y,t_k),$$
$$t_P))/(t_Q-t_P);$$

where the value $\tilde{g}_y^\sigma(x+(t_Q-t_k)\tilde{u}_f^\sigma(x,y,t_k),y+(t_Q-t_k)\tilde{v}_f^\sigma(x,y,t_k),t_Q)$ of the spatial partial with respect to the component y derivative of the estimated next filtered image function is given as the following bilinear interpolation $$\tilde{g}_y^\sigma(x+(t_Q-t_k)\tilde{u}_f^\sigma(x,y,t_k), y+(t_Q-t_k)\tilde{v}_f^\sigma(x,y,t_k), t_Q) = \quad (5\text{-}18)$$
$$(1-\theta_{t_Q,2}^\sigma)((1-\theta_{t_Q,1}^\sigma)g_y^\sigma(x_{t_Q,1}, y_{t_Q,1}, t_Q) +$$
$$\theta_{t_Q,1}^\sigma g_y^\sigma(x_{t_Q,2}, y_{t_Q,2}, t_Q)) +$$
$$\theta_{t_Q,2}^\sigma((1-\theta_{t_Q,1}^\sigma)g_y^\sigma(x_{t_Q,3}, y_{t_Q,3}, t_Q) + \theta_{t_Q,1}^\sigma g_y^\sigma(x_{t_Q,4}, y_{t_Q,4}, t_Q)),$$

of the values of the spatial partial with respect to the component y derivative of the next filtered image function at the image points defined by the relations (5-2), (5-3), (5-4), (5-5); while the value $\tilde{g}_y^\sigma(x+(t_P-t_k)\tilde{u}_f^\sigma(x,y,t_k),y+(t_P-t_k)\tilde{v}_f^\sigma(x,y,t_k),t_P)$ of the spatial partial with respect to the component y derivative of the estimated previous filtered image function is given as the following bilinear interpolation $$\tilde{g}_y^\sigma(x+(t_P-t_k)\tilde{u}_f^\sigma(x,y,t_k), y+(t_P-t_k)\tilde{v}_f^\sigma(x,y,t_k), t_P) = \quad (5\text{-}19)$$
$$(1-\theta_{t_P,2}^\sigma)((1-\theta_{t_P,1}^\sigma)g_y^\sigma(x_{t_P,1}, y_{t_P,1}, t_P) +$$
$$\theta_{t_P,1}^\sigma g_y^\sigma(x_{t_P,2}, y_{t_P,2}, t_P)) +$$
$$\theta_{t_P,2}^\sigma((1-\theta_{t_P,1}^\sigma)g_y^\sigma(x_{t_P,3}, y_{t_P,3}, t_P) + \theta_{t_P,1}^\sigma g_y^\sigma(x_{t_P,4}, y_{t_P,4}, t_P)).$$

of the values of the spatial partial with respect to the components y derivative of the previous filtered image function at the image points defined by the relations (5-7), (5-8), (5-9), (5-10).

Each non-boundary grid point (x,y) of the grid $\Omega_{t_k}^o$, k=1, ..., K is surrounded by its eight nearest neighbors specifying eight different directions on the image plane. For each boundary grid point (x,y) of the grid $\Omega_{t_k}^o$, k=1, ..., K the nearest neighbors are present only for some of these eight different directions. The symbol s is used to denote a vector on the image plane specifying one of these eight different directions on the image plane. The symbol S is used to denote the set of these eight vectors. Let $\Omega_{t_k,s}^o$, k=1, ..., K, s∈S be a subgrid of the grid $\Omega_{t_k}^o$ with the property that every grid point (x,y) of the subgrid $\Omega_{t_k,s}^o$ has the nearest in the direction s neighbor on the grid $\Omega_{t_k}^o$. For each k=1, ..., K, and for each vector s from the set S specifying a particular direction on the image plane, for the directional smoothness function $(s, \nabla \tilde{u}_f^o(x,y,t_k))$, $(x,y) \in \Omega_{t_k}^o$ for the horizontal component $\tilde{u}_f^o(x,y,t_k)$ of the current estimate of the velocity vector field as the finite difference approximation to the directional derivative of the horizontal components $\tilde{u}_f^o(x,y,t_k)$ of the current estimate of the velocity vector field as follows. For every point (x,y) of the subgrid $\Omega_{t_k,s}^o$ of the grid $\Omega_{t_k}^o$, the value of the directional smoothness function $(s, \nabla \tilde{u}_f^o(x,y,t_k))$ at the point (x,y) is defined to be equal to the difference between the value $\tilde{u}_f^o(x_{k,s},y_{k,s},t_k)$ of the horizontal component of the current estimate of the velocity vector at the nearest in the direction s neighbor $(x_{k,s},y_{k,s})$ of this grid point (x,y) and the value $\tilde{u}_f^o(x,y,t_k)$) of the horizontal component of the current estimate of the velocity vector at this grid point (x,y). For every point (x,y) of the grid $\Omega_{t_k}^o$ not belonging to the subgrid $\Omega_{t_k,s}^o$ the value of the directional smoothness function $(s,\nabla\tilde{u}_f^o(x,y,t_k))$ at the point (x,y) is defined to be equal to zero. For each k=1, ..., K, and for each vector s from the set S specifying a particular direction on the image plane, form the directional smoothness function $(s,\nabla\tilde{v}_f^o(x,y,t_k))$, $(x,y)\epsilon\Omega_{t_k}^o$ for the vertical component $v_f^o(x,y,t_k)$ of the current estimate of the velocity vector field as the finite difference approximations to the directional derivatives of the vertical component $\tilde{v}_f^o(x,y,t_k)$ of the current estimate of the velocity vector field as follows. For every point (x,y) of the subgrid $\Omega_{t_k,s}^o$ of the grid $\Omega_{t_k}^o$, the value of the directional smoothness function $(s,\nabla\tilde{v}_f^o(x,y,t_k))$ at the point (x,y) is defined to be equal to the difference between the value $\tilde{v}_f^o(x_{k,s},y_{k,s},t_k)$ of the vertical component of the current estimate of the velocity vector at the nearest in the direction s neighbor $(x_{k,s},y_{k,s})$ of this grid point (x,y) and the value $v_f^o(x,y,t_k)$) of the vertical component of the current estimate of the velocity vector at this grid point (x,y). For every point (x,y) of the grid $\Omega_{t_k}^o$ not belonging to the subgrid $\Omega_{t_k,s}^o$ the value of the directional smoothness function $(s,\nabla\tilde{v}_f^o(x,y,t_k))$ at the point (x,y) is defined to be equal to zero.

VI. Systems of Nonlinear and Linear Equations

For every k=1, ..., K, the system of nonlinear equations relative to the unknown current estimate $(\tilde{u}_f^o(t_k),\tilde{v}_f^o(t_k))$ of the velocity vector field is formed by combining the optical flow function $\tilde{g}_t^o$ and its spatial derivatives $\tilde{g}_{t\tilde{u}}^o$, $\tilde{g}_{t\tilde{v}}^o$ for each filter and each image band specified by the index g∈G together with the directional smoothness functions $(s,\nabla\tilde{u}_f^o)$, $(s,\nabla\tilde{v}_f^o)$ for each image direction s∈S and together with some constant parameters as follows $$\sum_{g\in G}\frac{0.5 r_g \tilde{g}_{t\tilde{u}}^\sigma \tilde{g}_t^\sigma}{\exp(q^2(\nabla\tilde{u}_f^\sigma,\nabla\tilde{v}_f^\sigma)(\tilde{g}_t^\sigma)^2)}- \quad (6\text{-}1)$$

$$\sum_{s\in S}\frac{0.5 a_s(s,\nabla\tilde{u}_f^\sigma)}{\exp(b^2(s,\nabla'\tilde{g}_t^\sigma)((s,\nabla\tilde{u}_f^\sigma)^2+(s,\nabla\tilde{v}_f^\sigma)^2))}=\gamma^\sigma(\tilde{u}_{f,0}^\sigma-\tilde{u}_f^\sigma),$$

$$\sum_{g\in G}\frac{0.5 r_g \tilde{g}_{t\tilde{v}}^\sigma \tilde{g}_t^\sigma}{\exp(q^2(\nabla\tilde{u}_f^\sigma,\nabla\tilde{v}_f^\sigma)(\tilde{g}_t^\sigma)^2)}-$$

$$\sum_{s\in S}\frac{0.5 a_s(s,\nabla\tilde{v}_f^\sigma)}{\exp(b^2(s,\nabla'\tilde{g}_t^\sigma)((s,\nabla\tilde{u}_f^\sigma)^2+(s,\nabla\tilde{v}_f^\sigma)^2))}=\gamma^\sigma(\tilde{v}_{f,0}^\sigma-\tilde{v}_f^\sigma),$$

for every $(x,y)\epsilon\Omega_{t_k}^o$. Here: the expression $q^2(\nabla\tilde{u}_f^o,\nabla\tilde{v}_f^o)$, $(x,y)\epsilon\Omega_{t_k}^o$ represents a square of the norm of the gradient $(\nabla\tilde{u}_f^o,\nabla\tilde{v}_f^o)$ of the velocity vector $(\tilde{u}_f^o,\tilde{v}_f^o)$ and is defined by the relation $$q^2(\nabla\tilde{u}_f^\sigma,\nabla\tilde{v}_f^\sigma)\equiv p_0^2+p_1^2\|(\nabla\tilde{u}_f^\sigma(x,y,t_k),\nabla\tilde{v}_f^\sigma(x,y,t_k))\|^2= \quad (6\text{-}2)$$

$$p_0^2+p_1^2\sum_{s\in S}\rho_s(s,\nabla\tilde{u}_f^\sigma(x,y,t_k))^2+\rho_s(s,\nabla\tilde{v}_f^\sigma(x,y,t_k))^2,$$

where $\rho_s$ is the length of the vector s, s∈S and $p_0$, $p_1$ are positive constant parameters; the expression $b^2(s,\nabla'\tilde{g}_t^o)$, $(x,y)\epsilon\Omega_{t_k}^o$, s∈S is defined by the relation $$b^2(s,\nabla'\tilde{g}_t^\sigma)\equiv b^2(s,\nabla'\tilde{g}_t^\sigma(f,x,y,t_k,\tilde{u}_f^\sigma(x,y,t_k),\tilde{v}_f^\sigma(x,y,t_k)))= \quad (6\text{-}3)$$

$$c^2+\sum_{g\in G}\rho_g b_g^2(s,\nabla'\tilde{g}_t^\sigma(f,x,y,t_k,\tilde{u}_f^\sigma(x,y,t_k),\tilde{v}_f^\sigma(x,y,t_k)))^2,$$

where $$\nabla'\tilde{g}_t^\sigma(f,x,y,t_k,\tilde{u}_f^\sigma(x,y,t_k),\tilde{v}_f^\sigma(x,y,t_k))\equiv(\tilde{g}_{t\tilde{u}}^\sigma(f,x,y,t_k,\tilde{u}_f^\sigma(x,y,t_k),$$
$$\tilde{v}_f^\sigma(x,y,t_k)),\tilde{g}_{t\tilde{v}}^\sigma(f,x,y,t_k,\tilde{u}_f^\sigma(x,y,t_k),\tilde{v}_f^\sigma(x,y,t_k))); \quad (6\text{-}4)$$

the expression $(\tilde{u}_{f,0}^o,\tilde{v}_{f,0}^o)\equiv(\tilde{u}_{f,0}^o(x,y,t_k),\tilde{v}_{f,0}^o(x,y,t_k))$, $(x,y)\epsilon\Omega_{t_k}^o$ represents the initial estimate of the velocity vector at the image point (x,y); and $r_g$, $a_s$, c, $b_g$, $\gamma^o$ are positive constant parameters. The system of linear equations relative to the improvement $(\Delta\tilde{u}_f^o(t_k),\Delta\tilde{v}_f^o(t_k))$ of the current estimate $(\tilde{u}_f^o(t_k),\tilde{v}_f^o(t_k))$ of the velocity vector field is defined as the symmetric, positive definite, and diagonally dominant linearization of the system of nonlinear equations (6-1) about the current estimate $(\tilde{u}_f^o(t_k),\tilde{v}_f^o(t_k))$ of the velocity vector field as follows $$\sum_{g\in G}\frac{r_g(\tilde{g}_{t\tilde{u}}^\sigma)^2\Delta\tilde{u}_f^\sigma}{\exp(3q^2(\nabla\tilde{u}_f^\sigma,\nabla\tilde{v}_f^\sigma)(\tilde{g}_t^\sigma)^2)}+\sum_{g\in G}\frac{r_g\tilde{g}_{t\tilde{u}}^\sigma\tilde{g}_{t\tilde{v}}^\sigma\Delta\tilde{v}_f^\sigma}{\exp(3q^2(\nabla\tilde{u}_f^\sigma,\nabla\tilde{v}_f^\sigma)(\tilde{g}_t^\sigma)^2)}- \quad (6\text{-}5)$$

$$\sum_{s\in S}\frac{a_s((s,\nabla\tilde{u}_f^\sigma)^2+(s,\nabla\tilde{v}_f^\sigma)^2\exp(2b^2(s,\nabla'\tilde{g}_t^\sigma))}{((s,\nabla\tilde{u}_f^\sigma)^2+(s,\nabla\tilde{v}_f^\sigma)^2)\exp(3b^2(s,\nabla'\tilde{g}_t^\sigma))}+\gamma_{1,1}^\sigma\Delta\tilde{u}_f^\sigma+$$
$$\frac{((s,\nabla\tilde{u}_f^\sigma)^2+(s,\nabla\tilde{v}_f^\sigma)^2))(s,\nabla(\Delta\tilde{u}_f^\sigma))}{((s,\nabla\tilde{u}_f^\sigma)^2+(s,\nabla\tilde{v}_f^\sigma)^2)}$$

$$\sum_{s\in S}\frac{a_s(\exp(2b^2(s,\nabla'\tilde{g}_t^\sigma))((s,\nabla\tilde{u}_f^\sigma)^2+(s,\nabla\tilde{v}_f^\sigma)^2))-1)(s,\nabla\tilde{u}_f^\sigma)(s,\nabla\tilde{v}_f^\sigma)(s,\nabla(\Delta\tilde{v}_f^\sigma))}{((s,\nabla\tilde{u}_f^\sigma)^2+(s,\nabla\tilde{v}_f^\sigma)^2)\exp(3b^2(s,\nabla'\tilde{g}_t^\sigma))}+\gamma_{1,2}^\sigma\Delta\tilde{v}_f^\sigma=$$
$$\frac{((s,\nabla\tilde{u}_f^\sigma)^2+(s,\nabla\tilde{v}_f^\sigma)^2)}{}$$

$$\sum_{g\in G}\frac{-0.5 r_g \tilde{g}_{t\tilde{u}}^\sigma \tilde{g}_t^\sigma}{\exp(q^2(\nabla\tilde{u}_f^\sigma,\nabla\tilde{v}_f^\sigma)(\tilde{g}_t^\sigma)^2)}+$$

$$\sum_{s\in S}\frac{0.5 a_s(s,\nabla\tilde{u}_f^\sigma)}{\exp(b^2(s,\nabla'\tilde{g}_t^\sigma))((s,\nabla\tilde{u}_f^\sigma)^2+(s,\nabla\tilde{v}_f^\sigma)^2))}-\gamma^\sigma(\tilde{u}_f^\sigma-\tilde{u}_{f,0}^\sigma),$$

$$\sum_{g\in G}\frac{r_g(\tilde{g}_{t\tilde{v}}^\sigma)^2\Delta\tilde{v}_f^\sigma}{\exp(3q^2(\nabla\tilde{u}_f^\sigma,\nabla\tilde{v}_f^\sigma)(\tilde{g}_t^\sigma)^2)}+$$

$$\sum_{g\in G}\frac{r_g\tilde{g}_{t\tilde{u}}^\sigma\tilde{g}_{t\tilde{v}}^\sigma\Delta\tilde{u}_f^\sigma}{\exp(3q^2\|(\nabla\tilde{u}_f^\sigma,\nabla\tilde{v}_f^\sigma)(\tilde{g}_t^\sigma)^2)}-$$

$$\sum_{s\in S}\frac{a_s((s,\nabla\tilde{v}_f^\sigma)^2+(s,\nabla\tilde{u}_f^\sigma)^2\exp(2b^2(s,\nabla'\tilde{g}_t^\sigma))}{((s,\nabla\tilde{u}_f^\sigma)^2+(s,\nabla\tilde{v}_f^\sigma)^2)\exp(3b^2(s,\nabla'\tilde{g}_t^\sigma))}+\gamma_{2,2}^\sigma\Delta\tilde{v}_f^\sigma+$$
$$\frac{((s,\nabla\tilde{u}_f^\sigma)^2+(s,\nabla\tilde{v}_f^\sigma)^2))(s,\nabla(\Delta\tilde{v}_f^\sigma))}{((s,\nabla\tilde{u}_f^\sigma)^2+(s,\nabla\tilde{v}_f^\sigma)^2)}$$

$$\sum_{s\in S}\frac{a_s(\exp(2b^2(s,\nabla'\tilde{g}_t^\sigma))((s,\nabla\tilde{u}_f^\sigma)^2+(s,\nabla\tilde{v}_f^\sigma)^2))-1)(s,\nabla\tilde{u}_f^\sigma)^2(s,\nabla\tilde{v}_f^\sigma)(s,\nabla(\Delta\tilde{u}_f^\sigma))}{((s,\nabla\tilde{u}_f^\sigma)^2+(s,\nabla\tilde{v}_f^\sigma)^2)\exp(3b^2(s,\nabla'\tilde{g}_t^\sigma))}+\gamma_{2,1}^\sigma\Delta\tilde{u}_f^\sigma=$$
$$\frac{((s,\nabla\tilde{u}_f^\sigma)^2+(s,\nabla\tilde{v}_f^\sigma)^2)}{}$$

-continued $$\sum_{g \in G} \frac{-0.5 r_g \tilde{g}_{\tilde{v}}^\sigma \tilde{g}_t^\sigma}{\exp(q^2 (\nabla \tilde{u}_f^\sigma, \nabla \tilde{v}_f^\sigma)(\tilde{g}_t^\sigma)^2)} +$$

$$\sum_{s \in S} \frac{0.5 a_s (s, \nabla \tilde{v}_f^\sigma)}{\exp(b^2 (s, \nabla' \tilde{g}_t^\sigma)((s, \nabla \tilde{u}_f^\sigma)^2 + (s, \nabla \tilde{v}_f^\sigma)^2))} - \gamma^\sigma (\tilde{v}_f^\sigma - \tilde{v}_{f,0}^\sigma),$$

for every $(x,y) \in \Omega_{t_k}^\sigma$. The solution of the system of linear equations (6-5) is obtained using a fast preconditioned iterative method which is based on the polynominal acceleration of the basic iterative method and can be described as follows.

VII. Linear System Solver

For every $k=1, \ldots, K$, and every $f=1, \ldots, F$, the system of linear equations (6-5) can be expressed in the matrix notation as $$M^\sigma(\tilde{u}_f^\sigma(t_k), \tilde{v}_f^\sigma(t_k))(\Delta \tilde{u}_f^\sigma(t_k), \Delta \tilde{v}_f^\sigma(t_k))^T = h^\sigma(\tilde{u}_f^\sigma(t_k), \tilde{v}_f^\sigma(t_k)), \quad (7\text{-}1)$$

where $(\Delta \tilde{u}_f^\sigma(t_k), \Delta \tilde{v}_f^\sigma(t_k))^T$ is the transpose vector of the row-vector $(\Delta \tilde{u}_f^\sigma(t_k), \Delta \tilde{v}_f^\sigma(t_k))$. The square matrix $M^\sigma(\tilde{u}_f^\sigma(t_k), \tilde{v}_f^\sigma(t_k))$ can be partitioned into four square submatrices corresponding to the vectors $(\Delta \tilde{u}_f^\sigma(t_k))$ and $(\Delta \tilde{v}_f^\sigma(t_k))$, respectively, so that the following relation is satisfied $$M^\sigma(\tilde{u}_f^\sigma(t_k), \tilde{v}_f^\sigma(t_k)) = \begin{pmatrix} M_{1,1}^\sigma(\tilde{u}_f^\sigma(t_k), \tilde{v}_f^\sigma(t_k)) & M_{1,2}^\sigma(\tilde{u}_f^\sigma(t_k), \tilde{v}_f^\sigma(t_k)) \\ M_{2,1}^\sigma(\tilde{u}_f^\sigma(t_k), \tilde{v}_f^\sigma(t_k)) & M_{2,2}^\sigma(\tilde{u}_f^\sigma(t_k), \tilde{v}_f^\sigma(t_k)) \end{pmatrix}. \quad (7\text{-}2)$$

Let the matrix $D_{i,j}^\sigma(\tilde{u}_f^\sigma(t_k), \tilde{v}_f^\sigma(t_k))$ be the diagonal part of the matrix $M_{i,j}^\sigma(\tilde{u}_f^\sigma(t_k), \tilde{v}_f^\sigma(t_k))$, for every $i,j=1,2$, and let the matrix $D^\sigma(\tilde{u}_f^\sigma(t_k), \tilde{v}_f^\sigma(t_k))$, be defined as in the relations $$D^\sigma(\tilde{u}_f^\sigma(t_k), \tilde{v}_f^\sigma(t_k)) = \begin{pmatrix} D_{1,1}^\sigma(\tilde{u}_f^\sigma(t_k), \tilde{v}_f^\sigma(t_k)) & D_{1,2}^\sigma(\tilde{u}_f^\sigma(t_k), \tilde{v}_f^\sigma(t_k)) \\ D_{2,1}^\sigma(\tilde{u}_f^\sigma(t_k), \tilde{v}_f^\sigma(t_k)) & D_{2,2}^\sigma(\tilde{u}_f^\sigma(t_k), \tilde{v}_f^\sigma(t_k)) \end{pmatrix}. \quad (7\text{-}3)$$

Then the preconditioned conjugate gradient iterative method for approximating the solution of the system of linear equations (7-1) can be described as follows.

For the sake of simplicity of the presentation the following notation shall be used:

$$w \equiv (\Delta \tilde{u}_f^\sigma(t_k), \Delta \tilde{v}_f^\sigma(t_k))^T, \quad M \equiv M^\sigma(\tilde{u}_f^\sigma(t_k), \tilde{v}_f^\sigma(t_k)),$$

$$h \equiv h^\sigma(\tilde{u}_f^\sigma(t_k), \tilde{v}_f^\sigma(t_k)), \quad D \equiv D^\sigma(\tilde{u}_f^\sigma(t_k), \tilde{v}_f^\sigma(t_k)). \quad (7\text{-}4)$$

Start with the initial approximation $w_0$ which is identically equal to zero, and with the initial residual $r_0$ which is identically equal to h, then for every $n=0, 1, \ldots, N-1$ the following iterative procedure is applied:

$$w_{n+1} = w_n + \alpha_n p_n, \quad r_{n+1} = r_n - \alpha_n q_n. \quad (7\text{-}5)$$

The coefficient $\alpha_n$ is defined as in the relation $$\beta_n = \frac{(r_n, z_n)}{(r_{n-1}, z_{n-1})}, n \geq 1, \beta_0 = 0, z_n = D^{-1} r_n, n \geq 0. \quad (7\text{-}8)$$

The vectors $q_n$, $p_n$ are given by the relation $$q_n = M p_n, n \geq 0, \quad p_n = z_n + \beta_n p_{n-1}, n \geq 1, p_0 = z_0. \quad (7\text{-}7)$$

The coefficient $\beta_n$ and the vector $z_n$ are defined as in the relation $$\alpha_n = \frac{(r_n, z_n)}{(p_n, q_n)}, n \geq 0. \quad (7\text{-}6)$$

VIII. Combining Labeled Estimates of Velocity Vector Fields

For every time moment $t_k$, $k=1, \ldots, K$, let the sequence of the subgrids $\Omega_{t_k,f}$, $f=1, \ldots, F$ of the grid $\Omega_{t_k}$ be the disjoint partitioning of the grid $\Omega_{t_k}$ defined below in terms of the following: the disjoint partitioning $\Omega_{t_p,f}$, $f=1, \ldots, F$ of the grid $\Omega_{t_p}$, the disjoint partitioning $\Omega_{t_Q,f}$, $f=1, \ldots, F$ of the gird $\Omega_{t_Q}$, and the labeled estimate $(\tilde{u}_f(t_k), \tilde{v}_f(t_k))$, $f=1, \ldots, F$ of the velocity vector field. For every $f=2, \ldots, F$, the subgrid $\Omega_{t_k,f}$ of the grid $\Omega_{t_k}$ consists of the image points (x,y) with the properties: i) for every point $(x,y) \in \Omega_{t_k,f}$, the point $(x+(t_P-t_k) \tilde{u}_f(x,y,t_k), y+(t_P-t_k) \tilde{v}_f(x,y,t_k))$ is not surrounded by the points of the subgrids $\Omega_{t_p,1}, \ldots, \Omega_{t_p,f-1}$; ii) for every point $(x,y) \in \Omega_{t_k,f}$, the point $(x+(t_Q-t_k) \tilde{u}_f(x,y,t_k), y+(t_Q-t_k) \tilde{v}_f(x,y,t_k))$ is not surrounded by the points of the subgrids $\Omega_{t_Q,1}, \ldots, \Omega_{t_Q,f-1}$; iii) in the case of the value of the label f being less than the value of the label F, every point (x,y) of the grid $\Omega_{t_k}$ belonging to the subgrid $\Omega_{t_k,f}$ does not belong to any of the subgrids $\Omega_{t_k,f+1}, \ldots, \Omega_{t_k,F}$. The subgrid $\Omega_{t_k,1}$ of the grid $\Omega_{t_k}$ consists of the image points (x,y) that do not belong to any of the subgrids $\Omega_{t_k,2}, \ldots, \Omega_{t_k,F}$. Then for every label $f=1, \ldots, F$ and for every point $(x,y) \in \Omega_{t_k,f}$ the value of the estimate $(\tilde{u}(x,y,t_k), \tilde{v}(x,y,t_k))$ of the velocity vector field is defined to be equal to the value of the labeled estimate $(\tilde{u}_f(x,y,t_k), \tilde{v}_f(x,y,t_k))$ of the velocity vector field.

IX. Description of the Image Estimation Algorithm

For each time moment $t_k$, $k=1, \ldots, K$, given the next digital image, which is defined on the grid of image points $\Omega_{t_Q}$, taken at the time moment $t_Q$ and consisting of the bands $I_{t_Q,1}, \ldots, I_{t_Q,B}$, and given the previous digital image, which is defined on the grid of image points $\Omega_{t_p}$, taken at the time moment $t_P$ and consisting of the bands $I_{t_p,1}, \ldots, I_{t_p,B}$, the method of estimating the missing digital image, which is defined on the grid of image points $\Omega_{t_k}$, taken at the time moment $t_k$ and consisting of the bands $I_{t_k,1}, \ldots, I_{t_k,B}$ based on the estimate $(\tilde{u}(t_k), \tilde{v}(t_k))$ of the velocity vector field, which is defined on the grid of image points $\Omega_{t_k}$, can be described as follows. For each image band $b=1, \ldots, B$, the value of the estimate $I_{t_k,b}$ of the missing digital image band is equal to the sum of the scaled by the factor $(t_k-t_P)/(t_Q-t_P)$ value of the estimated next digital image band and the scaled by the factor $(t_Q-t_k)/(t_Q-t_P)$ value of the estimated previous digital image band at the points (x,y) of the grid $\Omega_{t_k}$ where both the estimated next digital image band and the estimated previous digital image band are defined. For each image band $b=1, \ldots, B$, the value of the estimate $I_{t_k,b}$ of the missing digital image band is equal to the value of the estimated next digital image band at the points (x,y) of the grid $\Omega_{t_k}$ where only the estimated next digital image band is defined. For each image band $b=1, \ldots, B$, the value of the estimate $I_{t_k,b}$ of the missing digital image band is equal to the value of the estimated previous digital image band at the points (x,y) of the grid $\Omega_{t_k}$ where only the estimated previous digital image band is defined. To obtain the estimated next digital image band, for every $f=1, \ldots, F$ find the grid of image points $\Omega_{t_Q,f}$ $(\tilde{u}(t_k), \tilde{v}(t_k))$ which are the taken at the time moment $t_Q$ estimated perspective projections onto the image plane of the visible points in the scene, whose perspective projections onto the image plane at the time moment $t_k$ are the grid points $\Omega_{t_k,f}$; and then bilinearly interpolate the belonging to the subgrid $\Omega_{t_k,f}$ portion of the next digital image band $I_{t_Q,b}$ from the grid of points $\Omega_{t_Q}$ where the next digital image is defined to those points of the grid $\Omega_{t_Q,f}(\tilde{u}(t_k),\tilde{v}(t_k))$ that are surrounded by the points of the grid $\Omega_{t_Q,f}$. To obtain the estimated previous digital image band, for every f=1, . . . , F find the grid of image points $\Omega_{t_P,f}(\tilde{u}(t_k),\tilde{v}(t_k))$ which are the taken at the time moment $t_P$ estimated perspective projections onto the image plane of the visible points in the scene, whose perspective projections onto the image plane at the time moment $t_k$ are the grid points $\Omega_{t_k,f}$; and then bilinearly interpolate the belonging to the subgrid $\Omega_{t_k,f}$ portion of the previous digital image band $I_{t_P,b}$ from the grid of points $\Omega_{t_P}$ where the previous digital image is defined to those points of the grid $\Omega_{t_P,f}(\tilde{u}(t_k),\tilde{v}(t_k))$ that are surrounded by the points of the grid $\Omega_{t_P,f}$. To obtain the grid of image points $\Omega_{t_Q,f}$ $(\tilde{u}(t_k),\tilde{v}(t_k))$, f=1, . . . , F, each image point of the grid $\Omega_{t_k,f}$ is shifted by the amount equal to the scaled by the factor $(t_Q-t_k)$ value of the estimated velocity vector defined at that grid point. To obtain the grid of image points $\Omega_{t_P,f}(\tilde{u}(t_k),\tilde{v}(t_k))$, f=1, . . . , F, each image point of the grid $\Omega_{t_k,f}$ is shifted by the amount equal to the scaled by the factor $(t_k-t_P)$ value of the estimated velocity vector defined at that grid point.

For a given label value f=1, . . . , F, let (x,y) be an image point from the grid $\Omega_{t_k,f}$, then for a given band value b=1, . . . , B the value of the missing digital image band $I_{t_k,b}(x,y,\tilde{u}(x,y,t_k),\tilde{v}(x,y,t_k))$ at the image point (x,y) can be more precisely defined as follows.

The point $(x+(t_Q-t_k)\tilde{u}(x,y,t_k),y+(t_Q-t_k)\tilde{v}(x,y,t_k))$ of the grid $\Omega_{t_Q,f}(\tilde{u}(t_k),\tilde{v}(t_k))$ can be expressed in the following form $$(x+(t_Q-t_k)\tilde{u}(x,y,t_k),y+(t_Q-t_k)\tilde{v}(x,y,t_k))=(i_{t_Q,1}+\theta_{t_Q,1})h_{t_Q,1}+(i_{t_Q,2}+\theta_{t_Q,2})h_{t_Q,2}. \quad (9\text{-}1)$$

for some integer numbers $i_{t_Q,1}$, $i_{t_Q,2}$ and for some real numbers $\theta_{t_Q,1}$, $\theta_{t_Q,2}$ from the interval [0,1]. If the estimated next digital image is defined at the point (x,y,), then the point $(x+(t_Q-t_k)\tilde{u}(x,y,t_k),y+(t_Q-t_k)\tilde{v}(x,y,t_k))$ of the grid $\Omega_{t_Q,f}(\tilde{u}(t_k),\tilde{v}(t_k))$ is surrounded by the following points of the grid $\Omega_{t_Q,f}$:

$$(x_{t_Q,1},y_{t_Q,1})=i_{t_Q,1}h_{t_Q,1}+i_{t_Q,2}h_{t_Q,2}, \quad (9\text{-}2)$$

$$(x_{t_Q,2},y_{t_Q,2})=(i_{t_Q,1}+1)h_{t_Q,1}+i_{t_Q,2}h_{t_Q,2}, \quad (9\text{-}3)$$

$$(x_{t_Q,3},y_{t_Q,3})=i_{t_Q,1}h_{t_Q,1}+(i_{t_Q,2}+1)h_{t_Q,2}, \quad (9\text{-}4)$$

$$(x_{t_Q,4},y_{t_Q,4})=(i_{t_Q,1}+1)h_{t_Q,1}+(i_{t_Q,2}+1)h_{t_Q,2}, \quad (9\text{-}5)$$

and the value $I_{t_Q,b}(x+(t_Q-t_k)\tilde{u}(x,y,t_k),y+(t_Q-t_k)\tilde{v}(x,y,t_k))$ of the estimated nest digital image band is given as the following bilinear interpolation $$I_{t_Q,b}(x+(t_Q-t_k)\tilde{u}(x,y,t_k),y+(t_Q-t_k)\tilde{v}(x,y,t_k)) = \quad (9\text{-}6)$$
$$(1-\theta_{t_Q,2})((1-\theta_{t_Q,1})I_{t_Q,b}(x_{t_Q,1},y_{t_Q,1})+\theta_{t_Q,1}I_{t_Q,b}(x_{t_Q,2},y_{t_Q,2}))+$$
$$\theta_{t_Q,2}((1-\theta_{t_Q,1})I_{t_Q,b}(x_{t_Q,3},y_{t_Q,3})+\theta_{t_Q,1}I_{t_Q,b}(x_{t_Q,4},y_{t_Q,4}))$$

of the values of the next digital image band at the image points defined by the relations (9-2), (9-3), (9-4), (9-5).

The point $(x+(t_P-t_k)\tilde{u}(x,y,t_k),y+(t_P-t_k)\tilde{v}(x,y,t_k))$ of the grid $\Omega_{t_P,f}(\tilde{u}(t_k),\tilde{v}(t_k))$ can be expressed in the following form $$(x+(t_P-t_k)\tilde{u}(x,y,t_k),y+(t_P-t_k)\tilde{v}(x,y,t_k))=(i_{t_P,1}+\theta_{t_P,1})h_{t_P,1}+(i_{t_P,2}+\theta_{t_P,2})h_{t_P,2}. \quad (9\text{-}7)$$

for some integer numbers $i_{t_P,1}$, $i_{t_P,2}$ and for some real numbers $\theta_{t_P,1}$, $\theta_{t_P,2}$ from the interval [0,1]. If the estimated previous digital image is defined at the point (x,y), then the point $(x+(t_P-t_k)\tilde{u}(x,y,t_k),y+(t_P-t_k)\tilde{v}(x,y,t_k))$ of the gird $\Omega_{t_P,f}$ $(\tilde{u}(t_k),\tilde{v}(t_k))$ is surrounded by the following points of the grid $\Omega_{t_P,f}$:

$$(x_{t_P,1},y_{t_P,1})=i_{t_P,1}h_{t_P,1}+i_{t_P,2}h_{t_P,2}, \quad (9\text{-}8)$$

$$(x_{t_P,2},y_{t_P,2})=(i_{t_P,1}+1)h_{t_P,1}+i_{t_P,2}h_{t_P,2}, \quad (9\text{-}9)$$

$$(x_{t_P,3},y_{t_P,3})=i_{t_P,1}h_{t_P,1}+(i_{t_P,2}+1)h_{t_P,2}, \quad (9\text{-}10)$$

$$(x_{t_P,4},y_{t_P,4})=(i_{t_P,1}+1)h_{t_P,1}+(i_{t_P,2}+1)h_{t_P,2}, \quad (9\text{-}11)$$

and the value $I_{t_P,b}(x+(t_P-t_k)\tilde{u}(x,y,t_k),y+(t_P-t_k)\tilde{v}(x,y,t_k))$ of the estimated previous digital image band is given as the following bilinear interpolation $$I_{t_P,b}(x+(t_P-t_k)\tilde{u}(x,y,t_k),y+(t_P-t_k)\tilde{v}(x,y,t_k)) = \quad (9\text{-}12)$$
$$(1-\theta_{t_P,2})((1-\theta_{t_P,1})I_{t_P,b}(x_{t_P,1},y_{t_P,1})+\theta_{t_P,1}I_{t_P,b}(x_{t_P,2},y_{t_P,2}))+$$
$$\theta_{t_P,2}((1-\theta_{t_P,1})I_{t_P,b}(x_{t_P,3},y_{t_P,3})+\theta_{t_P,1}I_{t_P,b}(x_{t_P,4},y_{t_P,4}))$$

of the value of the previous digital image band at the image points defined by the relations (9-8), (9-9), (9-10), (9-11).

If the estimated next digital image and the estimated previous digital image are both defined at the image point (x,y), then the value $I_{t_k,b}(x,y,\tilde{u}(x,y,t_k),\tilde{v}(x,y,t_k))$ of the missing digital image band at the image point (x,y) is given by the relation $$I_{t_k,b}(x, y, \tilde{u}(x, y, t_k), \tilde{v}(x, y, t_k)) = \quad (9\text{-}13)$$
$$\Big((t_k-t_P)I_{t_Q,b}(x+(t_Q-t_k)\tilde{u}(x,y,t_k),y+(t_Q-t_k)\tilde{v}(x,y,t_k))+$$
$$(t_Q-t_k)I_{t_P,b}(x+(t_P-t_k)\tilde{u}(x,y,t_k),$$
$$y+(t_P-t_k)\tilde{v}(x,y,t_k))\Big)\Big/(t_Q-t_P),$$

where the value $I_{t_Q,b}(x+(t_Q-t_k)\tilde{u}(x,y,t_k),y+(t_Q-t_k)\tilde{v}(x,y,t_k))$ of the estimated next digital image band is given as the bilinear interpolation by the relation (9-6), while the value $I_{t_P,b}(x+(t_P-t_k)\tilde{u}(x,y,t_k),y+(t_P-t_k)\tilde{v}(x,y,t_k))$ of the estimated previous digital image band is given as the bilinear interpolation by the relation (9-12). If only the estimated next digital image is defined at the image point (x,y), then the value $I_{t_k,b}(x,y,\tilde{u}(x,y,t_k),\tilde{v}(x,y,t_k))$ of the missing digital image band at the image point (x,y) is given by the relation $$I_{t_k,b}(x,y,\tilde{u}(x,y,t_k),\tilde{v}(x,y,t_k))=I_{t_Q,b}(x+(t_Q-t_k)\tilde{u}(x,y,t_k),y+(t_Q-t_k)\tilde{v}(x,y,t_k)). \quad (9\text{-}14)$$

where the value $I_{t_Q,b}(x+(t_Q-t_k)\tilde{u}(x,y,t_k),y+(t_Q-t_k)\tilde{v}(x,y,t_k))$ of the estimated next digital image band is given as the bilinear interpolation by the relation (9-6). If only the estimated previous digital image is defined at the image point (x,y), then the value $I_{t_k,b}(x,y,\tilde{u}(x,y,t_k),\tilde{v}(x,y,t_k))$ of the missing digital image band at the image point (x,y) is given by the relation $$I_{t_k,b}(x,y,\tilde{u}(x,y,t_k),\tilde{v}(x,y,t_k))=I_{t_P,b}(x+(t_P-t_k)\tilde{u}(x,y,t_k),y+(t_P-t_k)\tilde{v}(x,y,t_k)), \quad (9\text{-}15)$$

where the value $I_{t_P,b}(x+(t_P-t_k)\tilde{u}(x,y,t_k),y+(t_P-t_k)\tilde{v}(x,y,t_k))$ of the estimated previous digital image band is given as the bilinear interpolation by the relation (9-12).

X. Summary of the Correspondance Algorithm

The method of computing the estimate of the velocity vector field $(\tilde{u}(t_k),\tilde{v}(t_k))$ corresponding to the missing image at the time moment $t_k$, for each $k=1,\ldots K$, can be described as the following multi-level resolution process:

1. For each band $b=1,\ldots,B$, read the image band $I_{t_P,b}$ into the array representing the grid $\Omega_{t_P}$. For each resolution level $\sigma=\sigma_1,\ldots,\sigma_M$, form the partitioning the grid $\Omega_{t_P}{}^\sigma$ into disjoint regions $\Omega_{t_P,f}{}^\sigma$, $f=1,\ldots,F$, and then for each index $g\in G$ representing the band $b$ form the following: the previous filtered image function $g^\sigma(x,y,t_P)$ according to the relation (4-1), the x-spatial partial derivative $g_x{}^\sigma(x,y,t_P)$ of the previous filtered image function according to the relation (4-2), and the y-spatial partial derivative $g_y{}^\sigma(x,y,t_P)$ of the previous filtered image function according to the relation (4-3).

2. For each band $b=1,\ldots,B$, read the image band $I_{t_Q,b}$ into the array representing the grid $\Omega_{t_Q}$. For each resolution level $\sigma=\sigma_1,\ldots,\sigma_M$, form the partitioning the grid $\Omega_{t_Q}{}^\sigma$ into disjoint regions $\Omega_{t_Q,f}{}^\sigma$, $f=1,\ldots,F$, and then for each index $g\in G$ representing the band $b$ form the following: the next filtered image function $g^\sigma(x,y,t_Q)$ according to the relation (4-1), the x-spatial partial derivative $g_x{}^\sigma(x,y,t_Q)$ of the next filtered image function according to the relation (4-2), and the y-spatial derivative $g_y{}^\sigma(x,y,t_Q)$ of the next filtered image function according to the relation (4-3).

3. Start with the label value $F$ taken as the current label value $f$.

4. Start with the coarsest resolution level $\sigma_M$ taken as the current resolution level $\sigma$.

5. In the case of the current resolution level $\sigma$ being the coarsest resolution level $\sigma_M$, set the initial estimate $(\tilde{u}_{f,0}{}^\sigma(t_k),\tilde{v}_{f,0}{}^\sigma(t_k))$ of the velocity vector field to some given (for example, constant) value, for every $k=1,\ldots,K$; otherwise project the final estimate $(\tilde{u}_{f,1}{}^{\delta(\sigma)}(t_k),\tilde{v}_{f,1}{}^{\delta(\sigma)}(t_k))$ of the velocity vector field at the previous coarser resolution level $\delta(\sigma)=\sigma_{m+1}$ to the current resolution level $\sigma=\sigma_m$ to obtain the initial estimate $(\tilde{u}_{f,0}{}^\sigma(t_k),\tilde{v}_{f,0}{}^\sigma(t_k))$ of the velocity vector field at the current resolution level $\sigma$, for every $k=1,\ldots,K$. Take the initial estimate $(\tilde{u}_{f,0}{}^\sigma(t_k),\tilde{v}_{f,0}{}^\sigma(t_k))$ of the velocity vector field at the current resolution level $\sigma$ as the current estimate $(\tilde{u}_f{}^\sigma(t_k),\tilde{v}_f{}^\sigma(t_k))$ of the velocity vector field at the current resolution level $\sigma$, for every $k=1,\ldots,K$.

6. Form the values of the expression $\|(\nabla\tilde{u}_f{}^\sigma(x,y,t_k),\nabla\tilde{v}_f{}^\sigma(x,y,t_k))\|^2$, for every $(x,y)\in\Omega_{t_k}{}^\sigma$, and for every $k=1,\ldots,K$ according to the relation (6-2).

7. For every $k=1,\ldots,K$, the values of the following functions are formed: the optical flow function $\tilde{g}_t{}^\sigma(f,x,y,t_k,\tilde{u}_f{}^\sigma(x,y,t_k),\tilde{v}_f{}^\sigma(x,y,t_k))$ according to the relation (5-11), for every $(x,y)\in\Omega_{t_k}{}^\sigma$, and for every $g\in G$; the spatial partial with respect to the component $\tilde{u}_f{}^\sigma(x,y,t_k)$ derivative $\tilde{g}_{t\tilde{u}}{}^\sigma(f,x,y,t_k,\tilde{u}_f{}^\sigma(x,y,t_k),\tilde{v}_f{}^\sigma(x,y,t_k))$ of the optical flow function according to the relation (5-14), for every $(x,y)\in\Omega_{t_k}{}^\sigma$, and for every $g\in G$; the spatial partial with respect to the component $\tilde{v}_f{}^\sigma(x,y,t_k)$ derivative $\tilde{g}_{t\tilde{v}}{}^\sigma(f,x,y,t_k,\tilde{u}_f{}^\sigma(x,y,t_k),\tilde{v}_f{}^\sigma(x,y,t_k))$ of the optical flow function according to the relation (5-17), for every $(x,y)\in\Omega_{t_k}{}^\sigma$, and for every $g\in G$; the expression $b^2(s,\nabla'\tilde{g}_t{}^\sigma(f,x,y,t_k,\tilde{u}_f{}^\sigma(x,y,t_k),\tilde{v}_f{}^\sigma(x,y,t_k)))^2$ according to the relation (6-3), for every $(x,y)\in\Omega_{t_k}{}^\sigma$, and for every $s\in S$.

8. Form the system of linear equations (6-5), for every $k=1,\ldots,K$.

9. Obtain the improvement $(\Delta\tilde{u}_f{}^\sigma(t_k),\Delta\tilde{v}_f{}^\sigma(t_k))$ of the current estimate of the velocity vector field $(\tilde{u}_f{}^\sigma(t_k),\tilde{v}_f{}^\sigma(t_k))$, for every $k=1,\ldots,K$, by iteratively solving the system of linear equations (6-5) as described in Section VII.

10. Take the improved estimate $(\tilde{u}_f{}^\sigma(t_k),\tilde{v}_f{}^\sigma(t_k))+(\Delta\tilde{u}_f{}^\sigma(t_k),\Delta\tilde{v}_f{}^\sigma(t_k))$ of the velocity vector field as the new current estimate $(\tilde{u}_f{}^\sigma(t_k),\tilde{v}_f{}^\sigma(t_k))$ of the velocity vector field, for every $k=1,\ldots,K$.

11. Repeat step 6 to step 10 until the current estimate $(\tilde{u}_f{}^\sigma(t_k),\tilde{v}_f{}^\sigma(t_k))$ of the velocity vector field is improved to the desired degree, for every $k=1,\ldots,K$. Take the resulted improved current estimate $(\tilde{u}_f{}^\sigma(t_k),\tilde{v}_f{}^\sigma(t_k))$ of the velocity vector field as the final estimate $(\tilde{u}_{f,1}{}^\sigma(t_k),\tilde{v}_{f,1}{}^\sigma(t_k))$ of the velocity vector field at the current resolution level $\sigma$, for every $k=1,\ldots,K$.

12. Take the next finer resolution level $\sigma_{m-1}$ as the current resolution level $\sigma$.

13. Repeat step 5 to step 12 until the finest resolution level $\sigma=\sigma_1$ is reached.

14. Take the next smaller label value $f-1$ as the current label value $f$.

15. Repeat step 4 to step 14 until the smallest label value $f=1$ is reached.

16. Bilinearly interpolate the final estimate $(\tilde{u}_{f,1}{}^\sigma(t_k),\tilde{v}_{f,1}{}^\sigma(t_k))$ of the finest resolution level $\sigma=\sigma_1$ to the grid of points $\Omega_{t_k}$ on the image plane to obtain the estimate $(\tilde{u}_f(t_k),\tilde{v}_f(t_k))$ of the velocity vector field corresponding to the label value $f$ and to the missing image at the time moment $t_k$, for every $f=1,\ldots,F$, and every $k=1,\ldots,K$.

17. Combine the estimate $(\tilde{u}_f(t_k),\tilde{v}_f(t_k))$, $f=1,\ldots,F$ of the velocity vector field to obtain the estimate $(\tilde{u}(t_k),\tilde{v}(t_k))$ of the velocity vector field, for every $k=1,\ldots,K$.

What is claimed is:

1. A method of motion compensated frame interpolation wherein an intermediate image frame is generated between two image frames in a motion image sequence, comprising the steps of:

a) identifying a foreground and a background for two successive frames in a motion image sequence;

b) estimating a velocity vector field for the foreground, and a velocity vector field for the background;

c) using the estimated velocity vector field for the foreground to locate corresponding points in the two frames and, if the points in both frames are in the foreground, to identify the location as foreground and, otherwise, as background in the intermediate image; and d) obtaining the intermediate image by using the foreground velocity vector field to perform motion compensated interpolation for the foreground in the intermediate image and using the background velocity vector field to perform motion compensated interpolation for the background in the intermediate image.

2. The method claimed in claim 1, further comprising the steps of:

e) identifying a second foreground for the two successive frames;

f) treating the first foreground as the background for the second foreground; and g) applying steps b) through d) to the second foreground and the first background.

3. The method claimed in claim 1, wherein step a) of identifying a foreground and a background is performed by a user employing a graphical user interface.

4. The method claimed in claim 1, wherein step b) of estimating a velocity vector field for the foreground, and a velocity vector field for the background includes the steps of:

i) computing a velocity vector field for a coarsest resolution level;

ii) project the velocity vector field from the previously computed resolution level onto a next finer resolution level;

iii) computing a velocity vector field at the finer resolution level;

iv) repeating steps b) and c) until a final finest resolution level is reached; and v) interpolating the velocity vector field at the finest resolution level to the pixel resolution level.

5. The method claimed in claim 1, wherein step d) of obtaining the intermediate image by using the foreground velocity vector field to perform motion compensated interpolation for the foreground in the intermediate image and using the background velocity vector field to perform motion compensated interpolation for the background in the intermediate image, further comprises the steps of:

i) for each pixel in the intermediate image, if it is a foreground pixel, using the foreground velocity vector at that pixel to find the corresponding points in the two frames, and computing the time weighted average of the two points; and ii) if it is a background pixel, finding the corresponding points in the two frames using the background velocity vector and if they are both background points, computing the time weighted average of the two points; if only one of the two corresponding points is a background point, using the value of the background point; and if they are both foreground point determining the value of the pixel from the values of neighboring background pixels in the intermediate image.

\* \* \* \* \*

UNITED STATES PATENT AND TRADEMARK OFFICE
CERTIFICATE OF CORRECTION

PATENT NO. : 6,008,865
DATED : December 28, 1999
INVENTOR(S) : Sergei Fogel

It is certified that error appears in the above-identified patent and that said Letters Patent is hereby corrected as shown below:

Col. 21, Equation (7-8) -- Please reverse Equation (7-8) with Equation (7-6) in Col. 22 --
Col. 22, Equation (7-6) -- Please reverse Equation (7-6) with Equation (7-8) in Col. 21 --

Signed and Sealed this

Eighth Day of August, 2000

Attest:

Q. TODD DICKINSON

Attesting Officer        Director of Patents and Trademarks